(12) United States Patent
Foucher et al.

(10) Patent No.: US 6,517,618 B2
(45) Date of Patent: Feb. 11, 2003

(54) PHOTOCHROMIC ELECTROPHORETIC INK DISPLAY

(75) Inventors: Daniel A. Foucher, Rochester, NY (US); Raj D. Patel, Oakville (CA); Naveen Chopra, Oakville (CA); Peter M. Kazmaier, Mississauga (CA); James Wojtyk, Ottawa (CA); Erwin Buncel, Kingston (CA)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/864,902

(22) Filed: May 24, 2001

(65) Prior Publication Data

US 2003/0002132 A1 Jan. 2, 2003

(51) Int. Cl.⁷ .............................. C09D 11/00
(52) U.S. Cl. ................. 106/31.16; 106/31.32; 106/31.64; 106/31.49; 106/31.78
(58) Field of Search ............ 106/31.16, 31.32, 106/31.64, 31.49, 31.78; 359/245, 296

(56) References Cited

U.S. PATENT DOCUMENTS 4,126,854 A    11/1978  Sheridon ................. 340/373

(List continued on next page.)

OTHER PUBLICATIONS

James T.C. Wojtyk, Peter M. Kazmaier and Erwin Buncel, Effects of Metal Ion Complexation on the Spiropyran–Merocyanine Interconversion: Development of a Thermally Stable Photo–Switch, Chem. Commun., 1998, p. 1703, No month available.

(List continued on next page.)

Primary Examiner—Helene Klemanski
(74) Attorney, Agent, or Firm—Judith L. Byorick

(57) ABSTRACT

Disclosed is an electrophoretic ink comprising a suspending fluid and, suspended in the suspending fluid, a plurality of particles comprising a mixture of a chelating agent and a spiropyran material of the formula

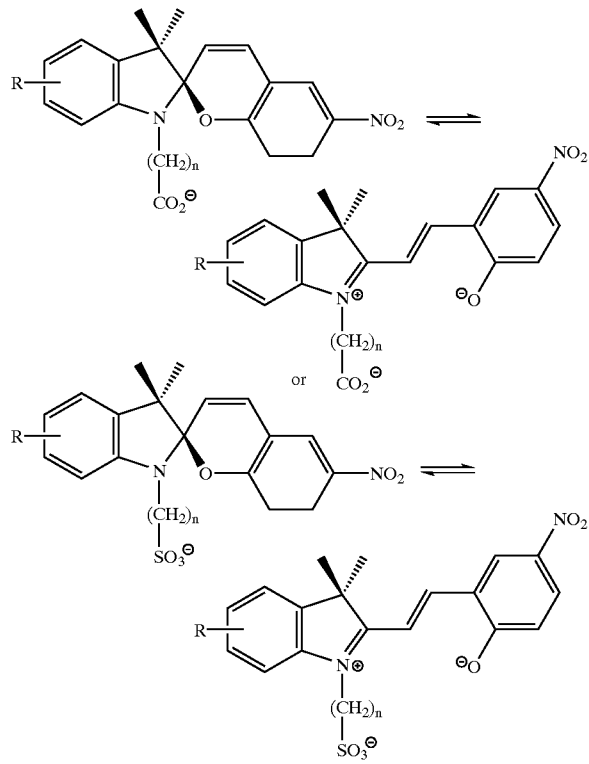

wherein n is an integer representing the number of repeat —$CH_2$— units and R is —H or —$CH=CH_2$, the particles being free to migrate within the suspending fluid under the influence of an electric field.

22 Claims, 5 Drawing Sheets

U.S. PATENT DOCUMENTS

| | | | |
|---|---|---|---|
| 4,143,103 A | | 3/1979 | Sheridon ........................ 264/4 |
| 4,261,653 A | | 4/1981 | Goodrich ..................... 350/362 |
| 4,438,160 A | | 3/1984 | Ishikawa et al. ............. 427/214 |
| 4,810,431 A | | 3/1989 | Leidner ........................ 264/15 |
| 5,017,225 A | | 5/1991 | Nakanishi et al. ........ 106/31.21 |
| 5,187,609 A | * | 2/1993 | DiSanto et al. .............. 359/296 |
| 5,389,945 A | | 2/1995 | Sheridon ...................... 345/85 |
| 5,551,973 A | | 9/1996 | Oliver et al. ............. 106/31.25 |
| 5,582,700 A | * | 12/1996 | Bryning et al. ............. 204/450 |
| 5,593,486 A | | 1/1997 | Oliver et al. ............ 106/31.29 |
| 5,604,027 A | | 2/1997 | Sheridon .................... 428/323 |
| 5,633,109 A | | 5/1997 | Jennings et al. ............. 430/115 |
| 5,705,738 A | * | 1/1998 | Kurihara ..................... 73/54.39 |
| 5,710,420 A | | 1/1998 | Martin et al. ................ 235/487 |
| 5,759,729 A | | 6/1998 | Martin et al. ................ 430/106 |
| 5,914,806 A | * | 6/1999 | Gordon, II et al. .......... 359/296 |
| 5,930,026 A | * | 7/1999 | Jacobson et al. ............ 359/296 |
| 5,989,629 A | | 11/1999 | Sacripante et al. .......... 427/180 |
| 6,017,386 A | | 1/2000 | Sano et al. ............... 106/31.32 |
| 6,120,839 A | * | 9/2000 | Comiskey et al. ........ 427/213.3 |
| 6,358,655 B1 | * | 3/2002 | Foucher et al. ......... 430/108.21 |
| 6,365,312 B1 | * | 4/2002 | Foucher et al. ......... 430/108.21 |

OTHER PUBLICATIONS

Abstract Supplied by Derwent Publications Ltd. London, GB for JP04 220657 A; Class GO8, AN 1992–313374 XP002211029, Aug. 1992.

* cited by examiner

PHOTOCHROMIC ELECTROPHORETIC INK DISPLAY

Copending application U.S. Ser. No. 09/864,386, pending, filed concurrently herewith, entitled "Photochromic Gyricon Display," with the named inventors Daniel A. Foucher, Raj D. Patel, Naveen Chopra, Peter M. Kazmaier, Erwin Buncel, and James Wojtyk, the disclosure of which is totally incorporated herein by reference, discloses a display comprising an arrangement of a plurality of optically anisotropic rotatable elements, each of said rotatable elements having a surface in contact with an enabling fluid, said rotatable elements being electrically dipolar in the presence of the enabling fluid and thus being subject to rotation upon application of an electric field, said rotatable elements being free to rotate in place but not free to translate substantially so as to disrupt the arrangement of rotatable elements, wherein a first portion of said surface contains a mixture of a chelating agent and a spiropyran material of the formula

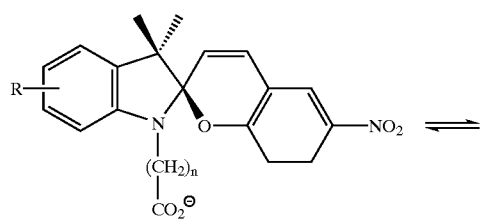

wherein n is an integer representing the number of repeat —$CH_2$— units and R is —H or —$CH=CH_2$, and wherein a second portion of said surface contains substantially no spiropyran.

Copending application U.S. Ser. No. 09/864,475, now U.S. Pat. No. 6,365,312, filed concurrently herewith, entitled "Marking Particles," with the named inventors Daniel A. Foucher, Raj D. Patel, Naveen Chopra, Peter M. Kazmaier, Erwin Buncel, and James Wojtyk, the disclosure of which is totally incorporated herein by reference, discloses marking particles comprising a first polymer, a second polymer, a chelating agent, and a spiropyran material of the formula

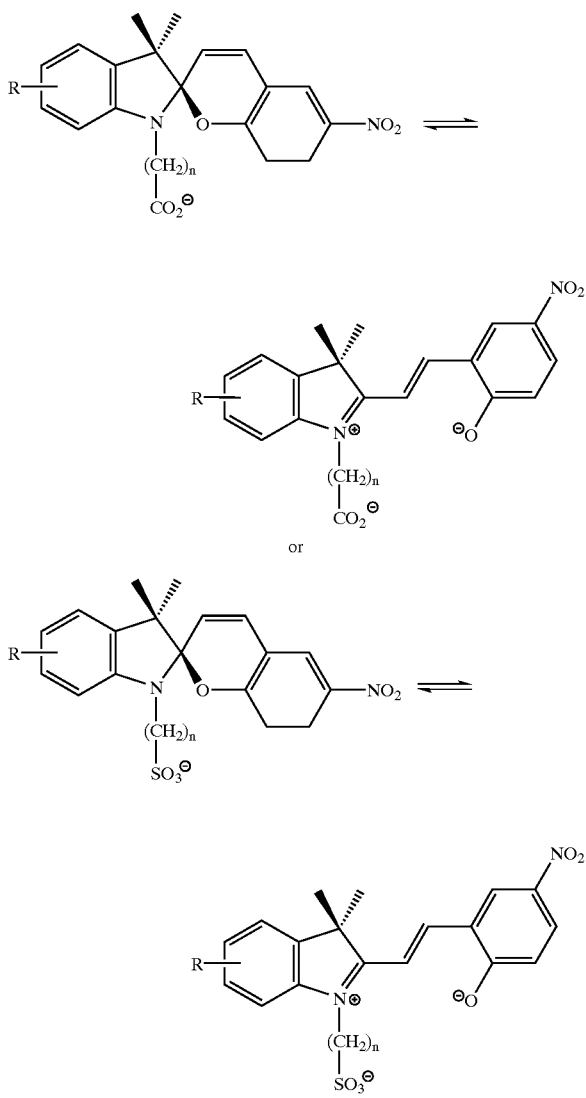

wherein n is an integer representing the number of repeat —$CH_2$— units and R is —H or —$CH=CH_2$. The marking particles comprise a core containing the first polymer in which is dispersed the chelating agent and the spiropyran and encapsulated within a shell of the second polymer formulated by an interfacial polymerization.

Copending application U.S. Ser. No. 09/864,535, now U.S. Pat. No. 6,358,655, filed concurrently herewith, entitled "Marking Particles," with the named inventors Daniel A. Foucher, Raj D. Patel, Naveen Chopra, and Peter M. Kazmaier, the disclosure of which is totally incorporated herein by reference, discloses marking particles comprising a resin, a chelating agent, and a spiropyran material which is of the formula

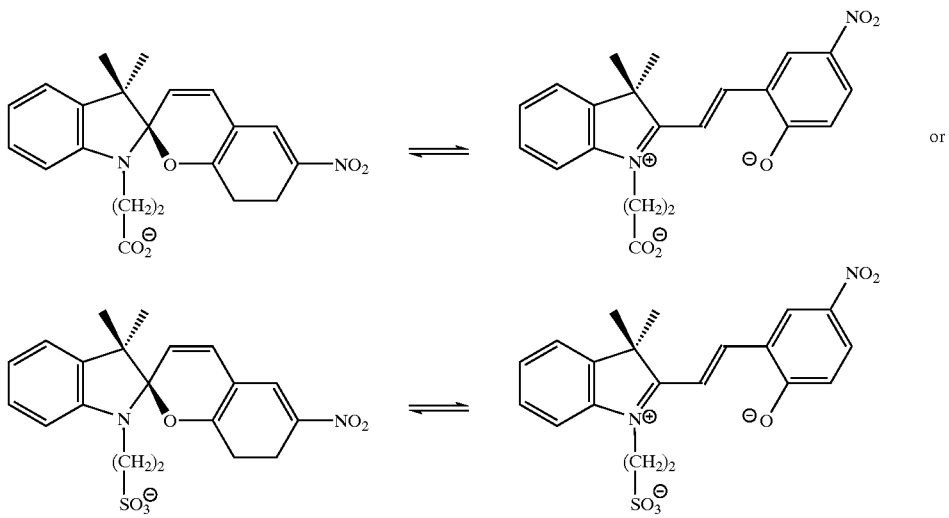

The marking particles are prepared by an emulsion aggregation process.

Copending application U.S. Ser. No. 09/035,518, now U.S. Pat. No. 6,235,395, filed Mar. 15, 1998, entitled "Flexible Displays," with the named inventors Guerino G. Sacripante and James C. Mikkelsen Jr. and published in Japan on Oct. 29, 1999 as Publication No. 11296111, the disclosures of which are totally incorporated herein by reference, discloses a display comprising a first component containing spheres encapsulated within a wax, and thereover and thereunder said component substrates.

Copending application U.S. Ser. No. 09/723,187, filed Nov. 27, 2000, entitled "Encapsulation Process," with the named inventors Naveen Chopra, Peter M. Kazmaier, and Paul J. Gerroir, the disclosure of which is totally incorporated herein by reference, discloses an encapsulation process including: (a) forming an emulsion composed of a continuous phase comprising a first liquid, a cationic material, and an anionic material, and a disperse phase composed of a plurality of droplets of a second liquid, wherein a number of the droplets includes therein one to five particles; and (b) inducing complex coacervation of the cationic material and the anionic material to form a shell around each of the droplets.

Copending application U.S. Ser. No. 09/749,688, filed Dec. 28, 2000, entitled "Gyricon Display Containing Chemical Absorbents," with the named inventor Nicholas K. Sheridon, the disclosure of which is totally incorporated herein by reference, discloses a gyricon sheet including a binder with rotating elements and dielectric fluid therein, and further including a chemical absorbent in association therewith. The chemical absorbent, such as zeolite or charcoal, absorbs contaminants present in the gyricon sheet that interfere with the reliable operation of the display. The chemical absorbent may be present either in the gyricon sheet itself or in a separate scavenger layer adjacent to and in contact with the gyricon sheet. The presence of the chemical absorbent significantly increases the length of time that the display can reliably display images.

Copending application U.S. Ser. No. 09/722,565, filed Nov. 28, 2000, entitled "Methods of Encapsulating Cores Using Ink Jets or Fogs," with the named inventors David K. Biegelsen, Naveen Chopra, Karen A. Moffat, and Nicholas K. Sheridon, the disclosure of which is totally incorporated herein by reference, discloses a method of coating a liquid or solid particulate core that involves dropping or suspending the particulate core in an atmosphere and then applying a liquid coating while the particulate core is dropped or suspended, the applying of the liquid coating being done by either (a) spraying the liquid coating onto the particulate core with an ink jet or (b) moving the particulate core through a fog of the liquid coating. In a further embodiment, the method can be used for encapsulating a liquid or solid particulate core within a polymeric shell by dropping or suspending the particulate core in an atmosphere, then applying by one of the above-mentioned methods a first coating composition containing a first reactant to the particulate core while the particulate core is being dropped or suspended, and subsequently exposing the particulate core coated with the first coating composition to a second composition containing a second reactant which reacts with the first reactant, which second composition is immiscible with the first coating composition, whereby the polymeric shell is formed by interfacial polymerization. By these methods, the formation of membranes or polymer shells around a variety of particulate core materials can be done using precise amounts of coating materials, thereby reducing waste and improving efficiencies of the process.

Copending application U.S. Ser. No. 09/723,204, filed Nov. 28, 2000, entitled "Swollen Gyricon Displays and Method of Making Same," with the named inventor Nicholas K. Sheridon, the disclosure of which is totally incorporated herein by reference, discloses a gyricon sheet which includes a binder containing rotating elements, wherein the binder is swollen with dielectric fluids so as to have cavities larger than the rotating elements around each of the rotating elements, the cavities filled with the dielectric fluids, and wherein the dielectric fluids comprise a mixture of at least two liquids having different binder swelling capabilities. By selection of the mixture of dielectric liquids, the extent of swelling of the gyricon sheet can be precisely controlled, enabling the gyricon sheet to exhibit a high level of display brightness.

Copending application U.S. Ser. No. 09/757,539, filed Jan. 11, 2001, entitled "Rotating Element Sheet Material With Dual Vector Field Addressing," with the named inventor Nicholas K. Sheridon, the disclosure of which is totally incorporated herein by reference, discloses a rotating element sheet material comprising a plurality of rotatable elements disposed in a substrate and in contact with an enabling fluid; where one of the plurality of rotatable elements comprises a core configured to present a first aspect in a first orientation and a second aspect in a second orientation, and where the first orientation and the second orientation are related by a rotational transformation about an axis of the rotatable element, and where the rotatable element in contact with the enabling fluid is further configured to exhibit a first addressing dipole configured to couple with a first vector field and a second addressing dipole configured to couple with a second vector field, and where the rotatable element exhibits the first aspect in the first vector field in a first direction and the second aspect in the second vector field in the first direction.

Copending application U.S. Ser. No. 09/757,531, filed Jan. 11, 2001, entitled "Rotating Element Sheet Material and Stylus With Gradient Field Addressing," with the named inventor Nicholas K. Sheridon, the disclosure of which is totally incorporated herein by reference, discloses a kit comprising rotating element sheet material and a gradient field stylus, where the sheet material comprises a plurality of rotatable elements disposed in a substrate and in contact with an enabling fluid; where the substrate comprises a plurality of sheet latching components; where one of the rotatable elements comprises first and second rotatable latching components and a core configured to present a first aspect in a first orientation and a second aspect in a second orientation, related by a rotational transformation about an axis of the rotatable element; and where one of the sheet latching components is proximal to the first rotatable latching component in the first orientation and proximal to the second rotatable latching component in the second orientation; and where the rotatable and sheet latching components exhibit an attractive force based on a first gradient field; and where a distal end of the gradient field stylus exhibits an attractive force with the rotatable latching components based on a second gradient field.

Copending application U.S. Ser. No. 09/440,675, filed Nov. 16, 1999, entitled "Applications for Electronic Reusable Paper," with the named inventors Helen M. Simoni and Bryan T. Preas and published in Canada on May 16, 2001 as Publication No. 2320417, the disclosures of which are totally incorporated herein by reference, discloses a system for displaying information which comprises a substrate and a conformable display media and control logic associated with the substrate. The display media has an input for receiving display information and the control logic provides display information to the display media through the display media input. The system may also contain other elements which interact with the control logic and the display media such as sensors, speakers, buttons, lights and an interface for communicating with the control circuitry.

Copending application U.S. Ser. No. 09/749,379, filed Dec. 28, 2000, entitled "Method for Making Microencapsulated Gyricon Beads," with the named inventors Nicholas K. Sheridon, Nassim Khonsari, and Naveen Chopra, the disclosure of which is totally incorporated herein by reference, discloses a method for making microencapsulated gyricon beads comprising the steps of converging first, second, third, and fourth materials in a liquid state; forming a bead from the first and second materials, the bead having two hemispheric surfaces with one surface differing from the other in optical and electrical characteristics; surrounding the bead with the third material; encapsulating the third material with the fourth material; and solidifying the fourth material.

Copending application U.S. Ser. No. 09/438,894, filed Nov. 12, 1999, entitled "Field Addressed Displays Using Charge Discharging in Conjunction With Charge Retaining Island Structures," with the named inventors Matthew E. Howard and Edward A. Richley, the disclosure of which is totally incorporated herein by reference, discloses an electric reusable paper sheet that uses a pattern of conductive charge-retaining islands on the outward-facing side of the first of two thin layers used to encapsulate an electric reusable paper substrate which interact with conductive areas in the encapsulating sheet. The second encapsulating layer may also be coated with a conductive material, or made of a conductive material, and may or may not be patterned. The electric reusable paper substrate and two encapsulating layers comprise a sheet of gyricon electric reusable paper on which images can be written and erased repeatedly. The patterned charge-retaining islands of the first encapsulating layer receive electric charges from an external charge-transfer device. After the charge-transfer device is removed, the conductive, charge-retaining islands hold electric charge, creating an electric field in the electric reusable paper sufficient to cause an image change.

Copending application U.S. Ser. No. 09/360,052, filed Jul. 23, 1999, entitled "Method and Apparatus for Fabricating Bichromal Elements," with the named inventor Edward A. Richley and published in Europe on Jan. 24, 2001 as Publication No. 070545, the disclosures of which are totally incorporated herein by reference, discloses an apparatus for fabricating bichromal elements which has a separator member having a central rotating point comprising first and second spaced apart, opposed surfaces with an edge region in contact with both of the opposed surfaces. The apparatus further includes an apparatus for dispensing first and second differently colored hardenable liquids substantially at the central rotating point of the first and second surfaces, respectively, and an apparatus for substantially uniformly spreading the liquid material over the first and second surfaces toward said edge region to form a reservoir of liquid material outboard of said edge region which is comprised of side-by-side regions of the first and second differently colored hardenable liquids, and for forming ligaments from the reservoir.

Copending application U.S. Ser. No. 09/360,088, filed Jul. 23, 1999, entitled "Method and Apparatus for Fabricating Bichromal Elements," with the named inventor Edward A. Richley and published in Europe on Jan. 24, 2001 as Publication No. 070544, the disclosures of which are totally incorporated herein by reference, discloses an apparatus for fabricating bichromal elements comprising a separator member having a central rotating point, the separator member having first and second spaced apart, opposed surfaces with an edge region in contact with both of said opposed surfaces. The spacing between the opposed surfaces varies with the distance outwardly from the central rotating point such that the spacing is the largest at the central rotating point and the spacing decreases outwards from the central rotating point and the spacing is a minimum at the edge region. Further each of the opposed surfaces has a substantially annular cup spaced apart from and substantially surrounding the central rotating point. The apparatus for fabricating bichromal elements also includes apparatus for dispensing first and second differently colored hardenable liquids in the cups of the first and second surfaces, respectively, and an apparatus for substantially uniformly spreading the liquid material in the annular cups located in the first and second surfaces and for substantially uniformly spreading the liquid material from the cups over the first and second surfaces toward said edge region to form a reservoir of liquid material outboard of said edge region, and for forming ligaments from said reservoir.

Copending application U.S. Ser. No. 09/427,346, filed Oct. 26, 1999, entitled "Bichromal Beads Having Electrolytes Therein," with the named inventor Francisco E. Torres, the disclosure of which is totally incorporated herein by reference, discloses a display medium and display apparatus with a substrate, and bichromal beads having an electrolyte and a polymer, wherein the bichromal beads are dispersed or contained in the substrate.

Copending application U.S. Ser. No. 09/427,411, filed Oct. 26, 1999, entitled "Bichromal Beads Having Charge Adjuvants Therein," with the named inventors Nicholas K. Sheridon and Ron Swidler, the disclosure of which is totally incorporated herein by reference, discloses a display medium with an encapsulant medium, and bichromal beads having a charge adjuvant, wherein the bichromal beads are dispersed or contained in the encapsulant medium.

Copending application U.S. Ser. No. 09/427,656, filed Oct. 26, 1999, entitled "Bichromal Beads Having Crystalline Materials Therein," with the named inventors Nicholas K. Sheridon, Edward A. Richley, And James Mikkelsen, the disclosure of which is totally incorporated herein by reference, discloses a display medium with an encapsulant medium, and bichromal beads having a crystalline material, wherein the bichromal beads are dispersed or contained in the encapsulant medium.

Copending application U.S. Ser. No. 09/465,801, filed Dec. 17, 1999, entitled "System and Method for Rotatable Element Assembly and Laminate Substrate Assembly," with the named inventors David K. Biegelsen, Joseph Crowley, and Alexander E. Silverman, the disclosure of which is totally incorporated herein by reference, discloses methods and systems used to assemble composite rotatable-element components and used to form a laminate substrate system, and use a plurality of rotatable-element components or rotatable-element component material of two classes. Each class is defined by a common response or responses to incident electromagnetic radiation of interest. The method for assembling a composite rotatable-element component comprises: dispersing a plurality of rotatable-element components of a first class to first preferred positions on a first carrier; dispersing a plurality of rotatable-element components of a second class to second preferred positions on a second carrier; performing a first manipulation of the first carrier and the second carrier such that one of the plurality of rotatable-element components of a first class and one of the plurality of rotatable-element components of a second class touch at a first contact point; and performing a second manipulation of the rotatable-element components that touch such that they bond to form a composite rotatable-element component. The method for assembling a laminate substrate further comprises: performing a third manipulation of the first carrier and the second carrier such that they touch at a set of second contact points; and performing a fourth manipulation of the first carrier and the second carrier such that they bond to form the laminate substrate.

Copending application U.S. Ser. No. 09/563,504, filed May 3, 2000, entitled "Rotating Element Sheet Material With Microstructured Substrate and Method of Use," with the named inventor John C. Knights, the disclosure of which is totally incorporated herein by reference, discloses systems comprising rotating element sheet material with a microstructured substrate component, and a method of assembling such rotating element sheet material. A first embodiment comprises a substrate, enabling fluid, a plurality of rotatable elements of a first class, and a plurality of rotatable elements of a second class, where the substrate comprises a cavity-containing matrix having a plurality of cavities of a first class and a plurality of cavities of a second class, where the plurality of rotatable elements of a first class are disposed within the plurality of cavities of a first class, and the plurality of rotatable elements of a second class are disposed within the plurality of cavities of a second class, and where the plurality of cavities of a first class and the plurality of cavities of a second class are arranged in a regular, repeating pattern in a substantially single layer, or alternatively, the plurality of cavities of a first class and the plurality of cavities of a second class are arranged to define macroscopic regions displaying common aspects. A further embodiment includes a method of macroscopically addressing rotating element sheet material.

Copending application U.S. Ser. No. 09/549,518, filed Apr. 14, 2000, entitled "Rotating Element Sheet Material With Generalized Containment Structure," with the named inventor Nicholas K. Sheridon, the disclosure of which is totally incorporated herein by reference, discloses rotating element sheet material with a generalized containment structure and methods of fabricating such rotating element sheet material, where the rotating element sheet material comprises a fibrous matrix, a plurality of rotatable elements, and an enabling fluid, and where the plurality of rotatable elements are disposed within the fibrous matrix and are in contact with the enabling fluid. In addition, rotating element sheet material with a generalized containment structure, and methods of fabricating such rotating element sheet material, includes rotating element sheet material which comprises a fibrous matrix and a plurality of micro-capsules, and where the micro-capsules define a hollow space therein, and the hollow space contains a subset of a plurality of rotatable elements and an enabling fluid, and where the plurality of micro-cavities are disposed within the fibrous matrix.

Copending application U.S. Ser. No. 09/643,670, filed Aug. 17, 2000, entitled "Electromagnetophotographic Display System and Method," with the named inventors Peter M. Kazmaier, Hadi K. Mahabadi, Jaan Noolandi, James H. Sharp, and Francisco E. Torres, the disclosure of which is totally incorporated herein by reference, discloses an electromagnetophoretic ink material for use as electronic and magnetic display elements. In particular, the invention relates to the preparation and use of microencapsulated aspect elements having both an electrostatic layer and a magnetic layer, and that can be addressed to produce a display aspect by the application of external electric fields and external magnetic fields.

Copending application U.S. Ser. No. 09/517,522, filed Mar. 2, 2000, entitled "Rotating Element Sheet Material With Reversible Highlighting," with the named inventor Alexander E. Silverman, the disclosure of which is totally incorporated herein by reference, discloses a kit comprising rotating element sheet material, a highlighting implement, and an erasing implement, a binder, and a method of use. The rotating element sheet material comprises a plurality of first rotatable elements and a plurality of second rotatable elements disposed in a substrate. Each first rotatable element in the plurality has a first collection of responses to incident electromagnetic radiation of interest. One response in the first collection renders the first rotatable element transparent-clear to incident electromagnetic energy of interest, and a second response renders the first rotatable element opaque to incident electromagnetic energy of interest, The first rotatable element also exhibits a first work function. Likewise, each second rotatable element has a second collection of responses to incident electromagnetic radiation of interest. A first response in the second collection renders the second rotatable element transparent-clear to the incident electromagnetic energy of interest. A second response renders the second rotatable element transparent-colored to the incident electromagnetic energy of interest. The second rotatable elements also exhibit a second work function that is less than the first work function. The addressing implement introduces a vector field in a first direction in the substrate where the vector field has a magnitude greater than the second work function and less than the first work function. In addition, the erasing implement introduces a vector field in a second direction in the substrate where the vector field has a magnitude greater than the second work function and less than the first work function. The binder is configured to accommodate the rotating element sheet material, the highlighting implement, and the erasing implement.

Copending application U.S. Ser. No. 09/216,829, filed Dec. 21, 1998, entitled "Ferrofluidic Electric Paper," with the named inventors David K. Biegelsen and Warren B. Jackson and published in Japan on Jul. 4, 2000 as Publication No. 2000187253, the disclosures of which are totally incorporated herein by reference, discloses a low cost, reusable electric paper that uses ferrofluidic colored fluids and an external magnetic writing instrument. The paper can be formed from laminated rolls of polymeric media that are roller die cut, inked, aligned, bonded, and cut to an appropriate size. The paper is formed from layers that define a hidden reservoir and a visible reservoir for each of an array of print cells that form a grid on the paper. A ferrofluidic coloring fluid is permanently contained within the paper and can move from the hidden reservoir to the visible reservoir. The size of the cells define the resolution of the paper. Initially, the paper appears white. However, after passing a writing instrument, such as a stylus, over desired print cells, these cells switch from a first hidden bistable state to a second visible bistable state. In the second visible bistable state, the ferrofluidic coloring fluid forms a desired image in a desired color or colors.

Copending application U.S. Ser. No. 09/037,767, filed Mar. 10, 1998, entitled "Charge Retention Islands for Electric Paper and Applications Thereof," with the named inventors Matthew E. Howard, Robert A. Sprague, and Edward A. Richley and published in Europe on Sep. 15, 1999 as Publication No. 942405, the disclosures of which are totally incorporated herein by reference, discloses an electric paper sheet that uses a pattern of conductive charge-retaining islands on the outward-facing side of the first of two thin layers used to encapsulate a gyricon sheet. The second encapsulating layer may also be coated with a conductive material, or made of a conductive material, and may or may not be patterned. The gyricon sheet and two encapsulating layers comprise a sheet of gyricon electric paper on which images can be written and erased repeatedly. The patterned charge-retaining islands of the first encapsulating layer receive electric charges from an external charge-transfer device. After the charge-transfer device is removed, the conductive, charge-retaining islands hold electric change, creating an electric field in the electric paper sufficient to cause an image change.

Copending application U.S. Ser. No. 09/199,473, filed Nov. 25, 1998, entitled "Magnetic Unlatching and Addressing of a Gyricon Display," with the named inventor Nicholas K. Sheridon, the disclosure of which is totally incorporated herein by reference, discloses a method of addressing a sheet of a rotating element sheet material that has a reduced applied electric field requirement when a gyricon sheet using magnetic trapping. A magnetic trapping gyricon sheet comprises a substrate with a plurality of rotatable elements disposed in the substrate. The elements comprise at least two portions, each portion having an associated optical modulation characteristic and the optical modulation characteristics of at least one portion are different from the optical modulation characteristic of at least one other portion. Importantly, one portion is magnetized, and the element also has an anisotropy for providing an electrical dipole moment. The electrical dipole moment renders the element electrically responsive such that when the rotating element is rotatably disposed in an electric field while the electrical dipole moment of the element is provided, the element tends to rotate to an orientation in which the electrical dipole moment aligns with the field. A small additional magnet is associated with each of the elements. When the magnetized portion of the element is the portion of the element nearest the additional magnet a magnetic attractive force will exist between the additional magnetized means and the magnetized portion of the element. A magnetic field is applied to the sheet in the vicinity of at least one of the rotatable elements and its associated magnet to reduce the magnetic attractive force therebetween. When the magnetic field has been reduced then applying a reduced electric field in the vicinity of at least one rotatable element will cause the rotatable element to align with the electric field.

Copending application U.S. Ser. No. 09/199,818, filed Nov. 25, 1998, entitled "Magnetic Unlatching and Addressing of a Gyricon Display," with the named inventor Nicholas K. Sheridon, the disclosure of which is totally incorporated herein by reference, discloses a method of making rotating element sheet material utilizing magnetic latching. First a plurality of rotating elements having a magnetized segment are mixed with magnetic particles to attract the magnetic particles to the magnetized segments. Then the rotating elements with the attached magnetic particles are mixed with a liquid elastomer. A magnetic field is applied to orient the rotating elements in a common direction. When the rotating elements and the attached magnetic particles have all been oriented the elastomer is cured to form an elastomer substrate with trapped rotating elements and magnetic particles. The elastomer substrate is then immersed into a bath of dielectric plasticizer which is absorbed more readily by elastomer than by the rotating elements. The elastomer substrate swells to create plasticizer-filled voids around the rotating elements. The magnetic particles remain incorporated within the elastomer to form magnetic material pads which are associated with an element.

Copending application U.S. Ser. No. 09/200,553, filed Nov. 25, 1998, entitled "Gyricon Displays Utilizing Magnetic Elements and Magnetic Trapping," with the named inventor Nicholas K. Sheridon, the disclosure of which is totally incorporated herein by reference, discloses a sheet material for use in a gyricon display in which a rotatable element, which has a portion which is capable of being permanently magnetized, may be oriented to experience either an attractive force or a repelling force between itself and another magnetized element. The attractive force between the element and the pad serve to latch the element in place and prevent unwanted display changes from taking place while the repellant force serves to trap the element in place for the same reasons. The element may be constructed to be either cylindrically or spherically shaped. Further, the sheet material may also contain soft magnetic material pads which may be arranged to provide multiple latching states as desired.

Copending application U.S. Ser. No. 09/199,544, filed Nov. 25, 1998, entitled "Gyricon Displays Utilizing Magnetic Addressing and Latching Mechanisms," with the named inventor Nicholas K. Sheridon, the disclosure of which is totally incorporated herein by reference, discloses a rotating element for use in an electric paper system in which the rotating element may be either substantially cylindrical or substantially spherical in shape and comprises at least three portions. Each portion has an associated optical modulation characteristic and the optical modulation characteristics of at least one portion are different from the optical modulation characteristics of at least one other portion. One of the portions is capable of being permanently magnetized. The rotating element also has an anisotropy for providing an electrical dipole moment. The electrical dipole moment renders the element electrically responsive such that when the rotating element is rotatably disposed in an electric field while the electrical dipole moment of the rotating element is provided, the rotating element tends to rotate to an orientation in which the electrical dipole moment aligns with the field.

Copending application U.S. Ser. No. 09/770,430, filed Jan. 26, 2001, entitled "Rotation and Threshold Mechanism for Twisting Ball Display," with the named inventor Edward A. Richley, the disclosure of which is totally incorporated herein by reference, discloses a rotation mechanism for bichromal balls in a twisting ball display based on electrostatic induction. A bichromal ball with hemispherically differentiated electrical time constants is immersed in a dielectric liquid containing a charge director solution. The liquid is contained within an encapsulant. The charge director solution has positive and negative ions with substantially different mobilities. Space charge clouds created in this fluid upon application of an electric field act so as to induce polarization differently in each hemisphere, leading to a net dynamic polarization. Interaction between the space charge and the induced polarization serves to rotate the ball. Ions are subsequently trapped at the fluid/encapsulant interface due to greater polarizability of the encapsulant. A threshold is obtained by the excess field needed to release the ions and so reverse the ion motion.

Copending application U.S. Ser. No. 09/239,293, filed Jan. 29, 1999, entitled "Tamper-Evident Electric Paper," with the named inventors Jock D. Mackinlay, Daniel G. Bobrow, Daniel H. Green, L. Charles Hebel, Nicholas K. Sheridon, Craig A. Smith, and William C. Emerson and published in Europe on Aug. 2, 2000 as Publication No. 1024470, the disclosures of which are totally incorporated herein by reference, discloses tamper-evident electric paper made of two sheets of electric paper bonded together, the bottom sheet of which includes a pattern. Any attempt to erase a writing on the top sheet of electric paper results in the pattern on the bottom sheet of electric paper being erased. Therefore any tampering by erasure of a writing on the tamper-evident electric paper is revealed by the absence of a portion of the pattern on the bottom sheet of electric paper. Single sheet tamper-evident electric paper has a complex pattern, such as an encryption, printed on a single sheet of electric paper. Any attempt to erase a writing on the electric paper also erases a portion of the encryption, thereby providing evidence of tampering.

Copending application U.S. Ser. No. 09/335,205, filed Jun. 17, 1999, entitled "Fabrication of a Twisting Ball Display Having Two or More Different Kinds of Balls," with the named inventors Nicholas K. Sheridon, Jock D. Mackinlay, and Maureen C. Stone, the disclosure of which is totally incorporated herein by reference, discloses a method of making a substrate in which sets of optically anisotropic spheroidal balls are disposed, as for use in an electrical twisting ball display. First and second sets of spheroidal balls are deposited on a receiving surface composed of an elastomer substrate material in an adhesive state, the spheroidal balls thus deposited adhering to the receiving surface. Balls of the first and second sets are physically distinguishable from one another. Balls of the first set can be deposited in a first arrangement, and balls of the second set, in a second arrangement. Each ball of each set has an optical anisotropy and an anisotropy for providing an electrical dipole moment, the electrical dipole moment rendering the ball electrically responsive such that when the ball is rotatably disposed in an electric field while the electrical dipole moment of the ball is provided, the ball tends to rotate to an orientation in which the electrical dipole moment aligns with the field. With the balls thus deposited, additional liquid elastomer material is poured over the balls adhering to the receiving surface, thereby covering the balls and forming an uncured substrate material in which the balls are disposed. This uncured substrate material is cured to form a substrate in which balls of the first and second sets are disposed. A plasticizer fluid can be applied to the substrate thus formed, thereby expanding the substrate so as to render the balls disposed in the substrate rotatable within the substrate.

Copending application U.S. Ser. No. 08/960,865, filed Oct. 30, 1997, entitled "Twisting Cylinder Display," with the named inventors Nicholas K. Sheridon and Joseph Crowley and published in Canada on Dec. 27, 1998 as Publication No. 2228920, the disclosures of which are totally incorporated herein by reference, discloses a gyricon or twisting-particle display based on nonspherodial (e.g. substantially cylindrical) optically anisotropic particles disposed in a substrate. The particles can be either bichromal or polychromal cylinders, preferably aligned parallel to one another and packed close together in a monolayer. A rotatable disposition of each particle is achievable while the particle is thus disposed in the substrate, for example, the particles can already be rotatable in the substrate, or can be rendered rotatable in the substrate by a nondestructive operation performed on the substrate. In particular, the substrate can be made up of an elastomer that is expanded by application of a fluid thereto so as to render the particles rotatable therein. A particle, when in its rotatable disposition, is not attached to the substrate. The close-packed monolayer configuration of particles provides excellent brightness characteristics and relative ease of manufacture as compared with certain other high-brightness gyricon displays. The substrate containing the cylinders can be fabricated with the swelled-elastomer techniques known from spherical-particle gyricon displays, with a simple agitation process step being used to align the cylinders within the sheeting material. Techniques for fabricating the cylinders are also disclosed.

BACKGROUND OF THE INVENTION

The present invention is directed to an electrophoretic ink. More specifically, the present invention is directed to an electrophoretic ink having photochromic characteristics. One embodiment of the present invention is directed to an electrophoretic ink comprising a suspending fluid and, suspended in the suspending fluid, a plurality of particles comprising a mixture of a chelating agent and a spiropyran material of the formula

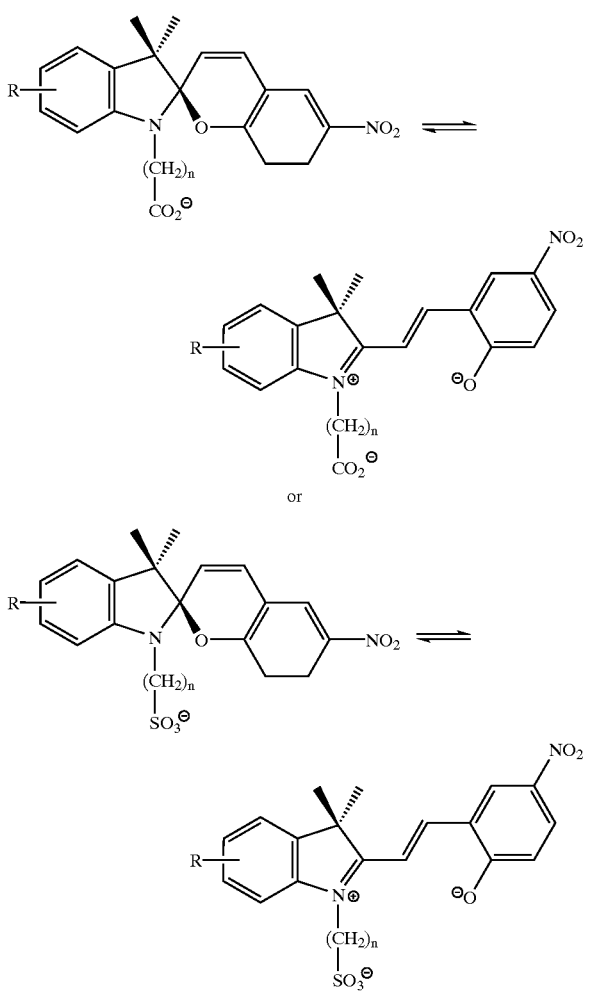

wherein n is an integer representing the number of repeat —$CH_2$— units and R is —H or —CH=$CH_2$, said particles being free to migrate within said suspending fluid under the influence of an electric field.

Photochromism in general is a reversible change of a single chemical species between two states having distinguishably different absorption spectra, wherein the change is induced in at least one direction by the action of electromagnetic radiation. The inducing radiation, as well as the changes in the absorption spectra, are usually in the ultraviolet, visible, or infrared regions. In some instances, the change in one direction is thermally induced. The single chemical species can be a molecule or an ion, and the reversible change in states can be a conversion between two molecules or ions, or the dissociation of a single molecule or ion into two or more species, with the reverse change being a recombination of the two or more species thus formed into the original molecule or ion. Photochromic phenomena are observed in both organic compounds, such as anils, disulfoxides, hydrazones, oxazones, semicarbazones, stilbene derivatives, o-nitrobenzyl derivatives, spiro compounds, and the like, and in inorganic compounds, such as metal oxides, alkaline earth metal sulfides, titanates, mercury compounds, copper compounds, minerals, transition metal compounds such as carbonyls, and the like. Photochromic materials are known in applications such as photochromic glasses, which are useful as, for example, ophthalmic lenses.

Electric reusable paper can be defined as any electronically addressable display medium that approximates paper in form and function. Electric reusable paper ideally is light-weight, thin, and flexible, and ideally it displays images indefinitely while consuming little or no power. In addition, electric reusable ideally is reusable so that the user is able to erase images and create new ones repeatedly. Preferably, electric reusable paper displays images using reflected light and allows a very wide viewing angle.

One form of electric paper uses an electrophoretic ink. Electrophoresis is defined as the movement of charged particles suspended in a suspending. fluid under the influence of an applied electric field. If the electric field is applied between electrodes in a cell, the particles will migrate, depending on their polarity, to either the cathode or the anode while the suspending fluid remains essentially stationary. When a coincident voltage is applied to selected electrodes, the particles in the suspending fluid migrate under the influence of the electric field to the electrode having a polarity opposite from their own. Since the selection of electrodes will generally relate to an image or pattern, the particles form an image or pattern.

In some specific embodiments of electrophoretic inks, the particles and suspending fluid can be encapsulated within microcapsules. In these embodiments, the particles migrate through the suspending fluid within the microcapsule under the influence of an applied electric field. The microcapsules can be incorporated within a binder and applied to a wide variety of substrates, including flexible and nonplanar substrates. In an encapsulated electrophoretic display, the binder material surrounds the capsules and separates the two bounding electrodes.

In other specific embodiments of electrophoretic inks, the suspending fluid containing the particles can be directly dispersed or emulsified into a binder (or a precursor to the binder material) to form what can be called a "polymer-dispersed electrophoretic display". In such displays, the individual electrophoretic phases can be referred to as "capsules" or "microcapsules" even though no capsule membrane is present. Such polymer-dispersed electrophoretic displays are considered to be subsets of encapsulated electrophoretic displays.

U.S. Pat. No. 5,633,109 (Jennings et al.), the disclosure of which is totally incorporated herein by reference, discloses an ink composition which comprises an aqueous liquid vehicle, a photochromic material, and a vesicle-forming lipid, wherein vesicles of the lipid are present in the ink.

U.S. Pat. No. 5,593,486 (Oliver et al.), the disclosure of which is totally incorporated herein by reference, discloses a hot melt ink composition comprising (a) an ink vehicle, said ink vehicle being a solid at about 25° C. and having a viscosity of from about 1 to about 20 centipoise at a temperature suitable for hot melt ink jet printing, said temperature being greater than about 45° C., (b) a photochromic material, (c) an optional colorant, and (d) an optional propellant.

U.S. Pat. No. 5,551,973 (Oliver et al.), the disclosure of which is totally incorporated herein by reference, discloses an ink composition which comprises an aqueous phase, an oil phase, a photochromic material, and a surfactant, said ink exhibiting a liquid crystalline gel phase at a first temperature and a liquid microemulsion phase at a second temperature higher than the first temperature.

U.S. Pat. No. 5,759,729 (Martin et al.), the disclosure of which is totally incorporated herein by reference, discloses a toner composition for the development of electrostatic latent images which comprises particles comprising a mixture of a resin and a photochromic material. Another embodiment of the present invention is directed to a liquid developer composition for the development of electrostatic latent images which comprises a nonaqueous liquid vehicle and a photochromic material, wherein the liquid developer has a resistivity of from about $10^8$ to about $10^{11}$ ohm-cm and a viscosity of from about 25 to about 500 centipoise. Yet another embodiment of the present invention is directed to a liquid developer composition for the development of electrostatic latent images which comprises a nonaqueous liquid vehicle, a charge control agent, and toner particles comprising a mixture of a resin and a photochromic material.

U.S. Pat. No. 5,710,420 (Martin et al.), the disclosure of which is totally incorporated herein by reference, discloses a method of embedding and recovering machine readable information on a substrate which comprises (a) writing data in a predetermined machine readable code format on the substrate with a photochromic marking material having a first state corresponding to a first absorption spectrum and a second state corresponding to a second absorption spectrum; and (b) thereafter effecting a photochromic change in at least some of the photochromic marking material from the first state to the second state.

James T. C. Wojtyk, Peter M. Kazmaier, and Erwin Buncel, "Effects of Metal Ion Complexation on the Spiropyran-Merocyanine Interconversion: Development of a Thermally Stable Photo-Switch," *Chem. Commun.* 1998, p. 1703, the disclosure of which is totally incorporated herein by reference, discloses spectrophotometric absorption and fluorescence measurements of spiropyrans

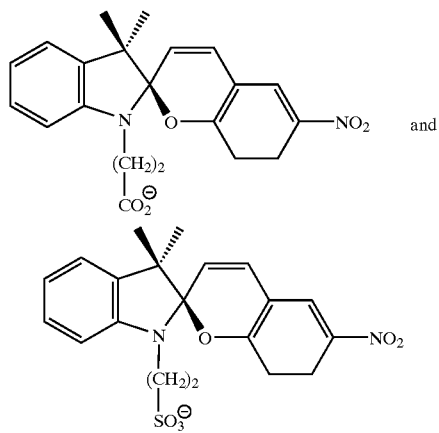

and modified with chelating functionalities, in the presence of $Ca^{2+}$ and $Zn^{2+}$, that provide evidence of a thermally stable spiropyran-merocyanine photoswitch that is modulated by the metal cations.

U.S. Pat. No. 4,126,854 (Sheridon), the disclosure of which is totally incorporated herein by reference, discloses a display system in which the display panel comprises a plurality of particles which have an electrical anisotropy due to hemispherical surface coatings of different Zeta potential and their distribution in a volume of a dielectric liquid, and which also have an optical anisotropy due to the hemispherical surface coatings having different optical characteristics which may be due to the color or other optical properties of the hemispherical coatings. Under the action of an external electric field, the particles will rotate in accordance with their electrical anisotropy to provide a display in accordance with their optical anisotropy. The display has switching threshold and memory capabilities.

U.S. Pat. No. 4,143,103 (Sheridon), the disclosure of which is totally incorporated herein by reference, discloses a method of making a display characterized by a plurality of particles which have an electrical anisotropy due to hemispherical surface coatings of different Zeta potential and their distribution in a volume of a dielectric liquid and which also have an optical anisotropy due to the hemispherical surface coatings having different optical characteristics. The particles are mixed with a light transparent liquid which is subsequently cured to form an elastomeric or rigid slab. Following curing of the liquid, the slab is emersed in a plasticizer (dielectric liquid) which is absorbed by the slab and which causes the slab to expand slightly. Expansion of the slab around the particles provides a plasticizer-filled cavity around each particle which cavities allow the particles to rotate to provide a display in accordance with their optical anisotropy but does not allow substantial translation of the particles.

U.S. Pat. No. 4,261,653 (Goodrich), the disclosure of which is totally incorporated herein by reference, discloses a light valve formed of a plurality of spherical dipolar particles suspended in a matrix material. Each spherical dipolar particle has a unified body formed in three discrete symmetrical sections. A central section is configured to permit light transmission when in a first orientation with respect to a path of light travel, and generally not permit light transmission when in a second, transverse orientation with respect to the path of light travel. A pair of intermediate sections bound the central section and are formed of a transparent material having an electrical permittivity that varies through a range of values as a function of the frequency of an applied electric field. A pair of outer sections bounds the intermediate sections and are formed of a material having a relatively stable electrical permittivity within the range of values of the intermediate sections. An applied electric field at one frequency extreme will cause the spherical dipolar particle to align in the first orientation to permit light transmission, and an applied electric field in the other frequency extreme will cause the particle to anti-align in the second, transverse orientation to shutter or reflect light. The matrix material is preferably formed of a plasticized elastomer that has a plurality of expanded cavities, with each cavity containing an outer lubricating layer to allow free rotational motion of a dipolar particle in the cavity. The use of a light valve of the present invention and method of manufacturing the spherical dipolar particle construction are also disclosed.

U.S. Pat. No. 4,438,160 (Ishikawa et al.), the disclosure of which is totally incorporated herein by reference, discloses a method for manufacturing rotary ball display devices wherein a plurality of such balls are provided with a coating of a color different from the remainder of the ball, the ball members are coated with a thin coating insoluble in the settling medium into which they are introduced, so that upon settling into a low viscosity liquid, they form a uniform layer. A high molecular weight hardenable coating material which is soluble in the low viscosity liquid is then poured onto the coated ball members to cover the layer. Then, the low viscosity liquid is removed and the hardenable coating material is caused to harden. The thin coating is then dissolved away from portions of the ball members to leave cavity portions thereabout into which a high resistivity liquid is introduced. The resulting ball members have a refractive index on the colored layer which is substantially the same as the refractive index of the high resistivity liquid contained in the cavities.

U.S. Pat. No. 5,389,945 (Sheridon), the disclosure of which is totally incorporated herein by reference, discloses an addressable display system including a paper-like sheet comprising a light transparent host layer loaded with a plurality of repositionable elements, the elements are movable from a first orientation in which they will present a first visual appearance, to a second orientation in which they will present a second visual appearance, and independent external addressing means relatively movable with respect to the display sheet for affecting the orientation of the repositionable elements.

U.S. Pat. No. 5,604,027 (Sheridon), the disclosure of which is totally incorporated herein by reference, discloses bichromal balls having two hemispheres, typically one black and one white, each having different electrical properties. Each ball is enclosed within a spherical shell and then a space between the ball and shell is filled with a liquid to form a microsphere so that the ball is free to rotate in response to an electrical field. The microspheres can then be mixed into a substrate which can be formed into sheets or can be applied to any kind of surface. The result is a film which can form an image from an applied electrical field.

U.S. Pat. No. 5,989,629 (Sacripante et al.), the disclosure of which is totally incorporated herein by reference, discloses a process for the preparation of bichromal spheres comprising (i) preparing monochromal spheres by the aggregation and coalescence of an emulsion resin with a first colorant and inorganic salt; (ii) contacting the resulting monochromal spheres with an oxidizing agent, followed by a polymerization with a vinyl monomer and a free radical initiator; (iii) forming a monolayer of the resulting monochromal spheres on a substrate; and (iv) subjecting the resulting monochromal spheres to a vapor thermal deposition with a second colorant dissimilar than the first colorant thereby to coat one hemisphere of each of said monochromal spheres, thereby resulting in bichromal spheres with dissimilar colors.

U.S. Pat. No. 4,810,431 (Leidner), the disclosure of which is totally incorporated herein by reference, discloses a particle display comprising a plurality of particles which in an electrical field rotate to expose either their white or black surface depending upon the polarity of the field. The particle display can be used for a flat panel ambient-illuminated numeric, alpha-numeric and other forms of visual displays.

U.S. Pat. No. 5,262,098 (Crowley et al.), the disclosure of which is totally incorporated herein by reference, discloses an apparatus for fabricating hemispherically bichromal balls, comprising a separator member having opposing first and second surfaces located and an edge region in contact with both surfaces, and delivery means for flowing first and second colored hardenable liquid material over the first and second surfaces, respectively, so that the liquid materials arrive at the edge at substantially the same flow rate and form a reservoir outboard of the edge region. The reservoir comprises side-by-side regions of different colors which do not intermix. Further means is provided for propelling the first and second liquid materials away from the separator member and out of the reservoir into a fluid medium as a plurality of side-by-side bichromal streams whose forward ends become unstable and break up into droplets which form into spherical balls, each of the balls comprising hemispheres of differently colored hardenable liquid, and means for collecting the bichromal balls.

U.S. Pat. No. 5,344,594 (Sheridon), the disclosure of which is totally incorporated herein by reference, discloses a method of forming hemispheric bichromal balls, including the steps of bringing together two streams of differently colored hardenable liquids for forming a single side-by-side bichromal stream, expelling said single side-by-side bichromal stream into a fluid as one or more free jets whose forward ends becomes unstable and break up into droplets which form into spherical balls, each of the balls comprising hemispheres of differently colored hardenable liquid, and finally hardening the balls.

U.S. Pat. No. 5,917,646 (Sheridon), the disclosure of which is totally incorporated herein by reference, discloses a combination of an optically transmissive dielectric fluid having a first refractive index and an optically anisotropic particle rotatably disposed in the fluid. The particle has at least one optically transmissive region having a second refractive index. The particle provides a first optical modulation characteristic when disposed in the fluid in a first orientation with respect to a flux of optical energy, and further provides a second optical modulation characteristic when disposed in the fluid in a second orientation with respect to a flux of optical energy. The particle has an anisotropy for providing an electrical dipole moment, the electrical dipole moment rendering the particle electrically responsive such that when the particle is rotatably disposed in an electric field while the electrical dipole moment of the particle is provided, the particle tends to rotate to an orientation in which the electrical dipole moment aligns with the field. For example, the disposition of the particle in the fluid can give rise to the electrical dipole moment of the particle. The fluid-particle combination can be used to make a gyricon or rotating-particle display in which each rotatable particle (e.g., spherical ball) in the display acts as a lens.

U.S. Pat. No. 5,777,782 (Sheridon), the disclosure of which is totally incorporated herein by reference, discloses a gyricon or rotating-particle display having an auxiliary optical structure. The display includes a substrate with an optically transmissive window, a plurality of particles disposed in the substrate, and an optical focusing element optically coupled to the window. Each particle has an anisotropy for providing an electrical dipole moment, the electrical dipole moment rendering the particle electrically responsive such that when the particle is rotatably disposed in an electric field while the electrical dipole moment of the particle is provided, the particle tends to rotate to an orientation in which the electrical dipole moment aligns with the field. A rotatable disposition of each particle is achievable while the particle is thus disposed in the substrate; when the particle is in this rotatable disposition, it is not attached to the substrate. Each particle, when rotatably disposed in the substrate, is disposable in first and second rotational orientations with respect to the optically transmissive window. Each particle provides a first optical modulation characteristic when disposed in its first orientation with respect to a flux of optical energy through the window, and further provides a second optical modulation characteristic when disposed in its second orientation with respect to a flux of optical energy through the window. The optical focusing element can be optically refractive; for example, it can include an array of converging lenses, such as a "fly's-eye" array of microlenses. In this case, the particles can be disposed in an array that is registered with the lens array.

U.S. Pat. No. 5,815,306 (Sheridon et al.), the disclosure of which is totally incorporated herein by reference, discloses a gyricon or rotating-particle display having an "eggcrate" substrate. The display includes a substrate having a cavity-containing matrix whose cavities are disposed substantially in a single layer and are arranged within the matrix substantially in a geometrically regular pattern, and a plurality of optically anisotropic particles disposed in the cavities in the substrate, with each cavity containing at most one of the optically anistropic particles. A rotatable disposition of each particle is achievable while the particle is thus disposed in the substrate; the particle, when in its rotatable disposition, is not attached to the substrate. Each particle, for example, can have an anisotropy for providing an electrical dipole moment, the electrical dipole moment rendering the particle electrically responsive such that when the particle is rotatably disposed in an electric field while the electrical dipole moment of the particle is provided, the particle tends to rotate to an orientation in which the electrical dipole moment aligns with the field. The single layer of cavities can be substantially planar, and the geometrical pattern of cavities can be a two-dimensional array pattern in the plane of the layer, such as a hexagonal, rectangular, or rhomboidal array pattern. The substrate can further include first and second members between which members the matrix is disposed; at least one of the members can include an optically transmissive window through which a flux of optical energy can pass so as to be incident on the particles.

U.S. Pat. No. 5,717,514 (Sheridon), the disclosure of which is totally incorporated herein by reference, discloses a multisegmented ball for an electrical twisting ball display device made up of spheroidal balls rotatably disposed in an elastomer substrate. The ball is composed of segments arrayed substantially parallel to one another, each segment being adjacent to at least one other segment and to no more than two other segments, adjacent segments being adjoined to one another at substantially planar interfaces. The segments include a first segment having a first thickness and a first optical modulation characteristic, a second segment having a second thickness and a second optical modulation characteristic, and a third segment having a thickness different from at least one of the first and second thicknesses and an optical modulation characteristic different from at least one of the first and second optical modulation characteristics. The ball has an anisotropy for providing an electrical dipole moment, the electrical dipole moment rendering the ball electrically responsive such that when the ball is rotatably disposed in a nonoscillating electric field while the electrical dipole moment of the ball is provided, the ball tends to rotate to an orientation in which the electrical dipole moment aligns with the field. A method and apparatus for fabricating the ball are also disclosed.

U.S. Pat. No. 5,919,409 (Sheridon), the disclosure of which is totally incorporated herein by reference, discloses a method of fabricating a multisegmented ball for an electrical twisting ball display device, which is made up of spheroidal balls rotatably disposed in an elastomer substrate. The ball is composed of segments arrayed substantially parallel to one another, each segment being adjacent to at least one other segment and to no more than two other segments, adjacent segments being adjoined to one another at substantially planar interfaces. The method for fabricating the multisegmented spheroidal balls comprises the steps of first providing a multiplicity of liquid flows, each liquid flow having an associated flow rate, each liquid flow being a flow of a hardenable liquid material associated with an optical modulation characteristic. The multiplicity of flows are then merged into a combined liquid flow where each one of the plurality of liquid flows is joined to at least one other of the plurality of liquid flows at a planar interface. After forming a combined liquid flow, a ligament is formed from the combined liquid flow and a plurality of spheroidal balls are formed from the ligament, each of the balls comprising a multiplicity of segments where each one of the multiplicity of segments is joined to at least one other of the multiplicity of segments at a planar interface. After the balls are formed they are hardened.

U.S. Pat. No. 5,891,479 (Sheridon), the disclosure of which is totally incorporated herein by reference, discloses an apparatus for fabricating a multisegmented ball for an electrical twisting ball display device, which is made up of spheroidal balls rotatably disposed in an elastomer substrate. The ball is composed of segments arrayed substantially parallel to one another, each segment being adjacent to at least one other segment and to no more than two other segments, adjacent segments being adjoined to one another at substantially planar interfaces. The apparatus has a plurality of separator members, each separator member having two opposed surfaces and an edge region in contact with both of said surfaces. A liquid flow is associated with each separator member and one of the surfaces on the separator member. Each one of the liquid flows is provided across its associated separator members toward the edge region of the separator member. Each of the liquid flows is of a hardenable liquid material and has an optical modulation characteristic and a flow rate. The apparatus also has apparatus for merging the liquid flows outboard of the edge regions of the separator members into a combined liquid flow and then apparatus for forming a ligament from the combined liquid flow. Apparatus for forming a plurality of spheroidal balls from the ligament; and apparatus for hardening the balls thus formed complete the apparatus.

U.S. Pat. No. 5,708,525 (Sheridon), the disclosure of which is totally incorporated herein by reference, discloses a multisegmented ball for an electrical twisting ball display device made up of spheroidal balls rotatably disposed in an elastomer substrate. The ball is composed of segments arrayed substantially parallel to one another. Each segment is adjacent to at least one other segment and to no more than two other segments, adjacent segments being adjoined to one another at substantially planar interfaces. Each segment has an optical modulation characteristic, the optical modulation characteristics of adjacent segments being different from one another. The segments of the ball include a first exterior segment, a second exterior segment, and a transparent interior segment. The ball has an anisotropy for providing an electrical dipole moment, the electrical dipole moment rendering the ball electrically responsive such that when the ball is rotatably disposed in a nonoscillating electric field while the electrical dipole moment of the ball is provided, the ball tends to rotate to an orientation in which the electrical dipole moment aligns with the field. Also disclosed are: a material made up of a substrate in which are disposed the aforementioned balls; an apparatus made up of a piece of this material, together with electrodes to facilitate a rotation of balls rotatably disposed therein; and a method for using this apparatus.

U.S. Pat. No. 5,717,515 (Sheridon), the disclosure of which is totally incorporated herein by reference, discloses a method for producing a canted electric field for an electrical twisting ball display device made up of electrically and optically anisotropic spheroidal balls rotatably disposed in a substrate. The display has an array of addressable elements, each array element including at least one spheroidal ball. According to the method, an array element is selected. A preferred direction of orientation is selected for balls of the selected array element, the direction of orientation forming an angle with a vector normal to a planar portion of the substrate surface in a vicinity of the selected array element, the angle being greater than 0 degree and less than 180 degrees. Balls of the selected array element are aligned with the preferred direction of orientation by applying an electric field in the vicinity of the selected array element, the electric field having an electric field vector oriented parallel to the selected preferred direction, thereby causing balls of the selected array element to rotate so as to align with the preferred direction of orientation. Also disclosed are: an electrode assembly for addressing a twisting ball display, capable of producing an electric field adjustable as to the direction of orientation of the field over a continuous angular range of directions; and a twisting ball apparatus incorporating this electrode assembly.

U.S. Pat. No. 5,760,761 (Sheridon), the disclosure of which is totally incorporated herein by reference, discloses a multisegmented, highlight color ball for an electrical twisting ball display device made up of spheroidal balls rotatably disposed in an elastomer substrate. The ball is composed of segments arrayed substantially parallel to one another, each segment being adjacent to at least one other segment and to no more than two other segments, adjacent segments being adjoined to one another at substantially planar interfaces. Each segment has an optical modulation characteristic, the optical modulation characteristics of adjacent segments being different from one another. The segments include: a central segment having a thickness; a first interior segment, situated adjacent to the central segment and having a thickness less than the central segment thickness; a second interior segment, situated opposite the first interior segment with respect to the central segment and having a thickness less than the central segment thickness; a first exterior segment; and a second exterior segment. The central segment can be of a background color; the first interior segment can be of a foreground color; the second interior segment can be of a highlight color, and the exterior segments can be transparent. The ball has an anisotropy for providing an electrical dipole moment, the electrical dipole moment rendering the ball electrically responsive such that when the ball is rotatably disposed in a nonoscillating electric field while the electrical dipole moment of the ball is provided, the ball tends to rotate to an orientation in which the electrical dipole moment aligns with the field. Also disclosed are: an apparatus made up of a substrate in which are disposed the aforementioned balls, together with electrodes to facilitate a rotation of balls rotatably disposed therein; and a method for using this apparatus.

U.S. Pat. No. 5,751,268 (Sheridon), the disclosure of which is totally incorporated herein by reference, discloses a seven-segment ball for an electrical twisting ball display device made up of spheroidal balls rotatably disposed in an elastomer substrate. The device built with the seven-segment balls can provide, for example, two fully saturated colors, two partially saturated colors, and a background color, such as white. The ball is composed of seven segments arrayed substantially parallel to one another, each segment being adjacent to at least one other segment and to no more than two other segments, adjacent segments being adjoined to one another at substantially planar interfaces. The seven segments include a transparent central segment, transparent first and second exterior segments, and four colored interior segments, two on each side of the central segment. For example, the first, second, third, and fourth interior segments can each have different colors such as red, black, blue, and green, The ball has an anisotropy for providing an electrical dipole moment, the electrical dipole moment rendering the ball electrically responsive such that when the ball is rotatably disposed in an electric field while the electrical dipole moment of the ball is provided, the ball tends to rotate to an orientation in which the electrical dipole moment aligns with the field. Also disclosed are: an apparatus made up of a substrate in which are disposed the aforementioned balls, together with electrodes to facilitate a rotation of balls rotatably disposed therein, and a method for using this apparatus.

U.S. Pat. No. 5,892,497 (Robertson), the disclosure of which is totally incorporated herein by reference, discloses a segmented ball for an electrical twisting ball color display device, the device being composed of different sets of spheroidal balls rotatably disposed in an elastomer substrate, each set being associated with a different display color. The segmented ball includes a colored interior segment surrounded on either side by transparent exterior segments, the three segments being arrayed substantially parallel to one another, with adjacent segments being adjoined to one another at substantially planar interfaces. The colored interior segment can have, for example, a transparent or opaque chromatic color, such as red, green, or blue. The ball has an anisotropy for providing an electrical dipole moment, the electrical dipole moment rendering the ball electrically responsive such that when the ball is rotatably disposed in a nonoscillating electric field while the electrical dipole moment of the ball is provided, the ball tends to rotate to an orientation in which the electrical dipole moment aligns with the field. Also disclosed are: a material made up of a substrate in which are disposed two or more different sets of the aforementioned balls, each set having a different center-segment color so as to provide a different observable display color; an apparatus made up of a piece of this material, together with electrodes to facilitate a rotation of balls rotatably disposed therein; and a method for using this apparatus.

U.S. Pat. No. 5,767,826 (Sheridon et al.), the disclosure of which is totally incorporated herein by reference, discloses a multilayer substrate material for a subtractive-color electrical twisting ball display. The material is composed of a layered substrate including first, second, and third layers, each layer of the substrate being a nearest neighboring layer with respect to at least one other layer and no more than two other layers. Spheroidal balls are disposed in each of the first, second, and third layers. In the first layer, each ball has at least two component regions including a component region having a first chromatic color, such as transparent cyan. In the second layer, each ball has at least two component regions including a component region having a second chromatic color, such as transparent magenta. In the third layer, each ball has at least two component regions including a component region having a third chromatic color, such as transparent yellow. Optionally, the substrate can further include a fourth layer in which are disposed spheroidal balls, each having at least two component regions including a black component region. Each ball in each layer has an anisotropy for providing an electrical dipole moment, the electrical dipole moment rendering the ball electrically responsive such that when the ball is rotatably disposed in a nonoscillating electric field while the electrical dipole moment of the ball is provided, the ball tends to rotate to an orientation in which the electrical dipole moment aligns with the field. Also disclosed are a twisting-ball apparatus made with the material, and a method for using this apparatus.

U.S. Pat. No. 5,739,801 (Sheridon), the disclosure of which is totally incorporated herein by reference, discloses a multithreshold electrical twisting ball display device. The device is composed of electrically and optically anisotropic spheroidal balls of at least two different rotation thresholds, disposed in an elastomer substrate, together with an addressing electrode assembly. The addressing electrode assembly allows a preferred region of the substrate to be selected in which at least one ball of the first set and at least one ball of the second set are disposed, and first and second electric fields to be applied to the preferred region thus selected, each of the first and second electric fields extending throughout the preferred region. The first field facilitates a contemporaneous rotation of balls of both the first and second sets rotatably disposed in the preferred region. The second electric field facilitates a rotation of balls of the second set rotatably disposed in the preferred region, without facilitating a rotation of any ball of the first set rotatably disposed in the preferred region. Also disclosed are the substrate material and electrode assembly for the device, and a method of using the device.

U.S. Pat. No. 5,982,346 (Sheridon et al.), the disclosure of which is totally incorporated herein by reference, discloses a method of making a substrate in which sets of optically anisotropic spheroidal balls are disposed, as for use in an electrical twisting ball display. First and second sets of spheroidal balls, are deposited on a receiving surface composed of an elastomer substrate material in an adhesive state, the spheroidal balls thus deposited adhering to the receiving surface. Balls of the first and second sets are physically distinguishable from one another. Balls of the first set can be deposited in a first arrangement, and balls of the second set, in a second arrangement. Each ball of each set has an optical anisotropy and an anisotropy for providing an electrical dipole moment, the electrical dipole moment rendering the ball electrically responsive such that when the ball is rotatably disposed in an electric field while the electrical dipole moment of the ball is provided, the ball tends to rotate to an orientation in which the electrical dipole moment aligns with the field. With the balls thus deposited, additional, liquid elastomer material is poured over the balls adhering to the receiving surface, thereby covering the balls and forming an uncured substrate material in which the balls are disposed. This uncured substrate material is cured to form a substrate in which balls of the first and second sets are disposed. A plasticizer fluid can be applied to the substrate thus formed, thereby expanding the substrate so as to render the balls disposed in the substrate rotatable within the substrate.

U.S. Pat. No. 5,737,115 (Mackinlay et al.), the disclosure of which is totally incorporated herein by reference, discloses a tristate light valve ball for an electrical twisting ball device composed of spheroidal balls rotatably disposed in an elastomer substrate. The ball is composed of segments arrayed substantially parallel to one another, each segment being adjacent to at least one other segment and to no more than two other segments. Adjacent segments are adjoined to one another at substantially planar interfaces. The segments include: a first, interior, nontransparent segment having a first optical modulation characteristic; a second exterior, transparent segment, adjacent to the first segment and having a second optical modulation characteristic; a third, interior, nontransparent segment having a third optical modulation characteristic; and a fourth, exterior, transparent segment adjacent to the third segment. For example, the ball can be made with a black first segment adjacent to a white third segment, surrounded on either side by clear second and fourth exterior segments. The ball has an anisotropy for providing an electrical dipole moment, the electrical dipole moment rendering the ball electrically responsive such that when the ball is rotatably disposed in a nonoscillating electric field while the electrical dipole moment of the ball is provided, the ball tends to rotate to an orientation in which the electrical dipole moment aligns with the field. Also disclosed are: a material made up of a substrate layer in which are disposed the aforementioned balls, with a colored backing joined to a rear surface of the layer; and a method for using a device incorporating the balls.

U.S. Pat. No. 5,754,332 (Crowley), the disclosure of which is totally incorporated herein by reference, discloses a gyricon or twisting-ball display having superior reflectance characteristics comparing favorably with those of white paper. The display is based on a material made up of optically anisotropic particles, such as bichromal balls, disposed substantially in a monolayer in a substrate. The particles are closely packed with respect to one another in the monolayer, preferably so that adjacent particle surfaces are as close to one another as possible. A rotatable disposition of each particle is achievable while the particle is thus disposed in the substrate; for example, the particles can already be rotatable in the substrate, or can be rendered rotatable in the substrate by a nondestructive operation performed on the substrate. In particular, the particles can be situated in an elastomer substrate that is expanded by application of a fluid thereto so as to render the particles rotatable therein. A particle, when in its rotatable disposition, is not attached to the substrate. A reflective-mode display apparatus can be constructed from a piece of the material together a mechanism (e.g., addressing electrodes) for facilitating rotation of at least one of the particles. The light reflected from the display is reflected substantially entirely from the monolayer of balls, so that lower layers are not needed. By eliminating the lower layers, the display can be made thinner, which in turn provides further advantages, such as lower drive voltage and better resolution due to better control of fringing fields.

U.S. Pat. No. 5,808,783 (Crowley), the disclosure of which is totally incorporated herein by reference, discloses a gyricon or twisting-ball display having superior reflectance characteristics comparing favorably with those of white paper. The display is based on a material made up of optically anisotropic particles, such as bichromal balls, disposed in a substrate having a surface. The particles situated closest to the substrate surface form substantially a single layer. Each particle in the layer has a center point, no particle in the layer being disposed entirely behind the center point of any nearest neighboring particle in the layer with respect to the substrate surface. Each particle in the layer has a projected area with respect to the substrate surface. Particles of the set are sufficiently closely packed with respect to one another in the layer that the union of their projected areas exceeds two-thirds of the area of the substrate surface. A rotatable disposition of each particle is achievable while the particle is thus disposed in the substrate; for example, the particles can already be rotatable in the substrate, or can be rendered rotatable in the substrate by a nondestructive operation. In particular, the particles can be situated in an elastomer substrate that is expanded by application of a fluid thereto so as to render the particles rotatable therein. A particle, when in its rotatable disposition, is not attached to the substrate. A reflective-mode display apparatus can be constructed from a piece of the material together with a mechanism (e.g., addressing electrodes) for facilitating rotation of at least one of the particles.

U.S. Pat. No. 5,914,805 (Crowley), the disclosure of which is totally incorporated herein by reference, discloses a gyricon or twisting-ball display having superior reflectance characteristics comparing favorably with those of white paper is based on a material made up of two populations (e.g., two different sizes) of optically anisotropic particles, such as bichromal balls, disposed in a substrate. Particles of the first population, as considered by themselves without the particles of the second population, are disposed in the substrate in a closely packed (e.g., geometrically regular) arrangement having interstices. Particles of the second population are disposed in the interstices of the arrangement. A rotatable disposition of each particle is achievable while the particle is thus disposed in the substrate; for example, the particles can already be rotatable in the substrate, or can be rendered rotatable in the substrate by a nondestructive operation performed on the substrate. In particular, the particles can be situated in an elastomer substrate that is expanded by application of a fluid thereto so as to render the particles rotatable therein. A particle, when in its rotatable disposition, is not attached to the substrate. A reflective-mode display apparatus can be constructed from a piece of the material together with a mechanism (e.g., addressing electrodes) for facilitating rotation of at least one of the particles.

U.S. Pat. No. 5,825,529 (Crowley), the disclosure of which is totally incorporated herein by reference, discloses a gyricon or twisting-ball display in which optically anisotropic particles, such as bichromal balls, are disposed directly in a working fluid, such as a dielectric liquid, without an elastomer substrate or other cavity-containing matrix. The display apparatus has an optically transmissive viewing surface, behind which the working fluid is disposed with the particles in it. The particles are arranged in a closely packed stable arrangement in which neighboring particles tend to keep one another in place. For example, the particles can be arranged in a hexagonally packed monolayer. The working fluid does not substantially constrain the particles to remain in the stable arrangement, notwithstanding the direct contact of the fluid with the particles.

U.S. Pat. No. 6,147,791 (Sheridon), the disclosure of which is totally incorporated herein by reference, discloses a sheet material for use in a gyricon display in which a rotatable element, which has a portion which is capable of being permanently magnetized may be oriented to experience an attractive force between itself and a soft magnetic material pad. The attractive force between the element and the pad serve to latch the element in place and prevent unwanted display changes from taking place. The element may be constructed to be either cylindrically or spherically shaped. The element and the soft magnetic material pads may be arranged to provide multiple latching states as desired.

U.S. Pat. No. 6,097,531 (Sheridon), the disclosure of which is totally incorporated herein by reference, discloses a method of forming magnetized rotating elements for a rotating element display where all the elements are magnetized in the same orientation is provided. First, at least two planar streams of hardenable liquids flowing in substantially the same direction are provided. Each stream has an associated optical modulation characteristic and at least one stream has an associated optical modulation characteristic different from at least one other stream. At least one stream includes a magnetic pigment. The streams are then merged to form a reservoir containing side-by-side amounts of each liquid from each stream. A free jet is then formed containing side-by-side amounts of each liquid from the reservoir. Then a portion of the free jet is passed through a magnetic field which is oriented transverse to the direction of the free jet to magnetize the magnetic pigment. The rotating elements formed can be either spherical in shape or cylindrical in shape. In either case, each element will comprise side-by-side segments. To form spherical elements the free jet can be broken into spherical portions either before or after the magnetic pigment has been magnetized. Ultimately, magnetized spherical portions of the free jet are hardened into rotating spherical elements and collected. To form cylindrical elements, the free jet is magnetized and hardened into a filament. The filament is then collected and broken into cylindrical elements.

U.S. Pat. No. 6,174,153 (Sheridon), the disclosure of which is totally incorporated herein by reference, discloses an apparatus for forming magnetized rotating elements for a rotating element display where all the elements are magnetized in the same orientation is disclosed. The apparatus comprises at least one separator member. Each separator member has a diameter, two opposed surfaces and an edge region in contact with both of the surfaces. Further included is an apparatus for providing at least two liquid flows wherein each one of the liquid flows has an associated separator member and an associated surface on the associated separator member, and each one of the liquid flows is provided across the associated surface of the associated separator members. The liquid flow flows toward the edge region of the associated separator member. The liquid flows are each a flow of hardenable liquid material associated with an optical modulation characteristic, and at least one of the liquid flows containing a magnetic pigment. The separator members are spun and the liquid flows are merged outboard of the edge regions of the one separator members to form a reservoir containing side-by-side amounts of each liquid. When the flow rate of the liquids is high enough, a free jet approximately in a plane outward from the reservoir, the free jet comprising side-by-side amounts of each liquid from the reservoir is formed. A magnetic field, is provided outward from the formation of the free jet and at least a portion of the free jet is passed through the magnetic field to magnetize the magnetic pigment. The magnetic field is aligned transverse to the free jet. If cylindrical elements are desired then the magnetized free jet is hardened into filaments which can be separated into cylindrical elements. If spherical elements are desired then the free jet is broken up into spherical elements before hardening.

U.S. Pat. No. 6,110,538 (Sheridon), the disclosure of which is totally incorporated herein by reference, discloses a method of making rotating element sheet material utilizing magnetic latching. The first step is providing a sheet of sheet material comprising a substrate with a surface and rotatable elements disposed therein. The elements each have an optical and electrical anisotropy, and comprise at least two portions. One of the portions is magnetizable. After the magnetizable portions have been oriented in a common direction, they are magnetized substantially uniformly. The elements can be oriented such that the magnetized portions are disposed towards the surface of the substrate. A layer of hardenable mixture containing a plurality of magnetic particles is then applied to the surface of the substrate. The hardenable liquid is kept liquid for a period of time to allow the migration magnetic particles to the area of the layer in the vicinity of the magnetized portions of the rotatable elements. Then the hardenable liquid is solidified to trap the magnetic particles in said layer in the area of the layer in the vicinity of the magnetized portion of the rotatable elements to form a magnetic pad.

U.S. Pat. No. 6,038,059 (Silverman), the disclosure of which is totally incorporated herein by reference, discloses several variations in full-color additive gyricons are shown. Each gyricon shown has been designed for ease of construction by eliminating the need for precise placement of rotating elements, alignment between the gyricon layers, if any, and alignment between the gyricon sheet and the addressing device.

U.S. Pat. No. 6,122,094 (Silverman), the disclosure of which is totally incorporated herein by reference, discloses several variations in full-color additive gyricons. Each gyricon shown has been designed for ease of construction by eliminating the need for precise placement of rotating elements, alignment between the gyricon layers, if any, and alignment between the gyricon sheet and the addressing device.

U.S. Pat. No. 6,162,321 (Silverman), the disclosure of which is totally incorporated herein by reference, discloses several variations in full-color additive gyricons. Each gyricon shown has been designed for ease of construction by eliminating the need for precise placement of rotating elements, alignment between the gyricon layers, if any, and alignment between the gyricon sheet and the addressing device.

U.S. Pat. No. 6,128,124 (Silverman), the disclosure of which is totally incorporated herein by reference, discloses several variations in full-color additive gyricons. Each gyricon shown has been designed for ease of construction by eliminating the need for precise placement of rotating elements, alignment between the gyricon layers, if any, and alignment between the gyricon sheet and the addressing device.

U.S. Pat. No. 6,197,228 (Sheridon), the disclosure of which is totally incorporated herein by reference, discloses a method of making rotating element sheet material utilizing magnetic latching. First a plurality of rotating elements, each element having a magnetized segment, are mixed with an elastomer and a plurality of magnetic particles to attract the magnetic particles to the magnetized segments. Then a magnetic field is applied to orient the elements in a common direction. When the rotating elements have all been oriented in a common direction, they are held in that orientation for a long enough period of time to allow the magnetic particles to migrate in the elastomer to the regions of the elastomer in the vicinity of the magnetized segments of the elements. The elastomer is then cured to form an elastomer substrate with trapped rotating elements and magnetic particles. The elastomer substrate is then immersed into a bath of dielectric plasticizer which is absorbed more readily by elastomer than by the rotating elements. The elastomer substrate swells to create plasticizer-filled voids around the rotating elements. The magnetic particles remain incorporated within the elastomer to form magnetic material pads which are associated with an element.

U.S. Pat. No. 6,055,091 (Sheridon et al.), the disclosure of which is totally incorporated herein by reference, discloses a gyricon or twisting-particle display based on nonspheroidal (e.g., substantially cylindrical) optically anisotropic particles disposed in a substrate. The particles can be bichromal cylinders, preferably aligned parallel to one another and packed close together in a monolayer. A rotatable disposition of each particle is achievable while the particle is thus disposed in the substrate; for example, the particles can already be rotatable in the substrate, or can be rendered rotatable in the substrate by a nondestructive operation performed on the substrate. In particular, the substrate can be made up of an elastomer that is expanded by application of a fluid thereto so as to render the particles rotatable therein. A particle, when in its rotatable disposition, is not attached to the substrate. The close-packed monolayer configuration of particles provides excellent brightness characteristics and relative ease of manufacture as compared with certain other high-brightness gyricon displays. The substrate containing the cylinders can be fabricated with the swelled-elastomer techniques known from spherical-particle gyricon displays, with a simple agitation process step being used to align the cylinders within the sheeting material. Techniques for fabricating the cylinders are also disclosed.

U.S. Pat. No. 5,894,367 (Sheridon), the disclosure of which is totally incorporated herein by reference, discloses an electric type paper display having memory properties, rapid response times, and multi-optical optical property display with an image of high quality. Each display element is wholly in contact with liquid in a cavity and the surface of each display element has a portion with a most positive charge. When an electrical field is applied from the outside, each display element is turned correspondingly to the direction of the electric field and, then electrically migrated through the liquid and attached to the inner surface of the cavity. Among multiple display surfaces of each display element an optical property is selected according to an image signal and is visible through a transparent support to an observer. Afterwards, the attached state of each display element, i.e., its display state is held by the action of an attraction force such as van der Waals force and electrostatic force acting between the circumferential surface of the display element and the inner surface of the cavity, even after the electric field is removed.

U.S. Pat. No. 5,922,268 (Sheridon), the disclosure of which is totally incorporated herein by reference, discloses an electric type paper display having memory properties, rapid response times and multi-optical property display with an image of high quality. Each display element is wholly in contact with liquid in a cavity and the surface of each display element has a portion with a most positive charge. When an electrical field is applied from the outside, each display element is turned correspondingly to the direction of the electric field and, then electrically migrated through the liquid and attached to the inner surface of the cavity. Among multiple display surfaces of each display element an optical property is selected according to an image signal and is visible through a transparent support to an observer. Afterwards, the attached state of each display element, i.e., its display state is held by the action of an attraction force such as van der Waals force and electrostatic force acting between the circumferential surface of the display element and the inner surface of the cavity, even after the electric field is removed.

U.S. Pat. No. 5,904,790 (Sheridon), the disclosure of which is totally incorporated herein by reference, discloses an electric type paper display having memory properties, rapid response times and multi-optical property display with an image of high quality is made. Each display element is wholly in contact with liquid in a cavity and the surface of each display element has a portion with a most positive charge. When an electrical field is applied from the outside, each display element is turned correspondingly to the direction of the electric field and, then electrically migrated through the liquid and attached to the inner surface of the cavity. Among multiple display surfaces of each display element an optical property is selected according to an image signal and is visible through a transparent support to an observer. Afterwards, the attached state of each display element, i.e., its display state is held by the action of an attraction force such as van der Waals force and electrostatic force acting between the circumferential surface of the display element and the inner surface of the cavity, even after the electric field is removed.

Sheridon, "The Gyricon—A Twist Ball Display," Proceedings of the Society of Information Display, Vol. 18/3 and 4 (1977), the disclosure of which is totally incorporated herein by reference, discloses a gyricon ambient light viewed display consisting of an elastomer sheet contained between transparent electrodes. The elastomer sheet changes from black to white or from white to black depending upon the polarity of the electrical field that is impressed between the electrodes. The elastomer sheet contains a high loading of small balls that are black on one hemisphere and white on the other. Each ball is contained in an individual oil-filled spherical cavity and is free to rotate in response to the applied electric field.

U.S. Pat. No. 3,612,758 (Evans et al.), the disclosure of which is totally incorporated herein by reference, discloses a color display device employing the electrophoretic migration of color pigment particles to form an image on a matrix addressable panel. One coordinate terminal is connected to a line reservoir containing electrophoretic ink particles of a given polarity while the other coordinate terminal is connected to a transparent conductor. The panel is viewed through the transparent conductor side in ambient illumination.

U.S. Pat. No. 5,930,026 (Jacobson et al.), the disclosure of which is totally incorporated herein by reference, discloses an electrophoretic display which has a substantially two-dimensional arrangement of microcapsules each having therein an electrophoretic composition of a dielectric fluid and a suspension of particles that visually contrast with the dielectric liquid and also exhibit surface charges; a pair of electrodes, at least one of which is visually transparent, disposed on and covering opposite sides of the microcapsule arrangement; and means for creating a potential difference between the two electrodes, the potential difference causing the particles to migrate toward one of the electrodes. The display may be powered by one or more piezoelectric elements, which are also suitable for powering other types of nonemissive displays.

U.S. Pat. No. 5,961,804 (Jacobson et al.), the disclosure of which is totally incorporated herein by reference, discloses an application-ready electrophoresis material includes a carrier and a dispersion of microcapsules therein, the microcapsules each containing a plurality of phases therein. At least some of the phases contrast visually and and exhibit differential responsiveness to an electric field, such that application of the field determines the visual appearance of the microcapsules. The material exhibits stability such the visual appearance persists despite removal of the field. In one aspect, the invention provides for enhanced stability of the visual appearance. In another aspect, the reflectivity of at least one of the phases is enhanced. In another aspect, one of the phases is particulate in nature and emits visible radiation.

U.S. Pat. No. 6,017,584 (Albert et al.), the disclosure of which is totally incorporated herein by reference, discloses electrophoretic displays and materials useful in fabricating such displays. In particular, encapsulated displays are disclosed. Particles encapsulated therein are dispersed within a suspending, or electrophoretic, fluid. This fluid may be a mixture of two or more fluids or may be a single fluid. The displays may further comprise particles dispersed in a suspending fluid, wherein the particles contain a liquid. In either case, the suspending fluid may have a density or refractive index substantially matched to that of the particles dispersed therein. Also disclosed are electro-osmotic displays. These displays comprise at least one capsule containing either a cellulosic or gel-like internal phase and a liquid phase, or containing two or more immiscible fluids. Application of electric fields to any of the electrophoretic displays described affects an optical property of the display.

U.S. Pat. No. 6,067,185 (Albert et al.), the disclosure of which is totally incorporated herein by reference, discloses electrophoretic displays and materials useful in fabricating such displays. In particular, encapsulated displays are disclosed. Particles encapsulated therein are dispersed within a suspending, or electrophoretic, fluid. This fluid may be a mixture of two or more fluids or may be a single fluid. The displays may further comprise particles dispersed in a suspending fluid, wherein the particles contain a liquid. In either case, the suspending fluid may have a density or refractive index substantially matched to that of the particles dispersed therein. Finally, also disclosed are electro-osmotic displays. These displays comprise at least one capsule containing either a cellulosic or gel-like internal phase and a liquid phase, or containing two or more immiscible fluids. Application of electric fields to any of the electrophoretic displays affects an optical property of the display.

U.S. Pat. No. 6,118,426 (Albert et al.), the disclosure of which is totally incorporated herein by reference, discloses a process for creating an electronically addressable display including multiple printing operations, similar to a multicolor process in conventional screen printing. In some of the process steps, electrically non-active inks are printed onto areas of the receiving substrate, and in other steps, electrically active inks are printed onto different areas of the substrate. The printed display can be used in a variety of applications. This display can be used as an indicator by changing state of the display after a certain time has elapsed, or when a certain pressure, thermal, radiative, moisture, acoustic, inclination, pH, or other threshold is passed. In one embodiment, the display is incorporated into a battery indicator. A sticker display is described. The sticker is adhesive backed and may then be applied to a surface to create a functional information display unit. This invention also features a display that is both powered and controlled using radio frequencies. It describes a complete system for controlling, addressing, and powering a display. The system includes an antenna or antennae, passive charging circuitry, and active control system, a display, and an energy storage unit. There is also a separate transmitter that provides the remote power for the display. The system is meant to be used anywhere it is useful to provide intermittent updates of information such as in a store, on a highway, or in an airport. A tile-based display allowing a modular system for large area display is created using a printable display material.

U.S. Pat. No. 6,120,588 (Jacobson), the disclosure of which is totally incorporated herein by reference, discloses a system of electronically active inks which may include electronically addressable contrast media, conductors, insulators, resistors, semiconductive materials, magnetic materials, spin materials, piezoelectric materials, optoelectronic, thermoelectric or radio frequency materials. Also disclosed is a printing system capable of laying down said materials in a definite pattern. Such a system may be used for instance to: print a flat panel display complete with onboard drive logic; print a working logic circuit onto any of a large class of substrates; print an electrostatic or piezoelectric motor with onboard logic and feedback or print a working radio transmitter or receiver.

U.S. Pat. No. 6,120,839 (Comiskey et al.), the disclosure of which is totally incorporated herein by reference, discloses electrophoretic displays and materials useful in fabricating such displays. In particular, encapsulated displays are disclosed. Particles encapsulated therein are dispersed within a suspending, or electrophoretic, fluid. This fluid may be a mixture of two or more fluids or may be a single fluid. The displays may further comprise particles dispersed in a suspending fluid, wherein the particles contain a liquid. In either case, the suspending fluid may have a density or refractive index substantially matched to that of the particles dispersed therein. Also disclosed are electro-osmotic displays. These displays comprise at least one capsule containing either a cellulosic or gel-like internal phase and a liquid phase, or containing two or more immiscible fluids. Application of electric fields to any of the electrophoretic displays described affects an optical property of the display.

U.S. Pat. No. 6,124,851 (Jacobson), the disclosure of which is totally incorporated herein by reference, discloses an electronic book comprising multiple, electronically addressable, page displays. Said page displays may be formed on flexible, thin substrates. Said book may additionally encompass memory, power, control functions and communications.

U.S. Pat. No. 6,130,773 (Jacobson et al.), the disclosure of which is totally incorporated herein by reference, discloses an electrophoretic display having a substantially two-dimensional arrangement of microcapsules each having therein an electrophoretic composition of a dielectric fluid and a suspension of particles that visually contrast with the dielectric liquid and also exhibit surface charges; a pair of electrodes, at least one of which is visually transparent, disposed on and covering opposite sides of the microcapsule arrangement; and a power source for creating a potential difference between the two electrodes, the potential difference causing the particles to migrate toward one of the electrodes. The display may be powered by one or more piezoelectric elements, which are also suitable for powering other types of nonemissive displays.

U.S. Pat. No. 6,130,774 (Albert et al.), the disclosure of which is totally incorporated herein by reference, discloses an electrophoretic display element including a capsule having a first, larger surface and a second, smaller surface. The capsule contains a suspending fluid and at least one particle dispersed within said suspending fluid. Application of a first electrical field causes the particle or particles to migrate towards the first, larger surface of the capsule, causing it to take on the visual appearance of the particles. Application of a second electrical field causes the particle or particles to migrate towards the second, smaller surface, allowing the capsule to take on the visual appearance of the dispersing fluid or of a substrate or electrode positioned behind the display element. Displays may be fabricated from multiple display elements arranged on a substrate.

U.S. Pat. No. 6,172,798 (Albert et al.), the disclosure of which is totally incorporated herein by reference, discloses an electrophoretic display element which includes a capsule having a first, larger surface and a second, smaller surface, The capsule contains a suspending fluid and at least one particle dispersed within said suspending fluid. Application of a first electrical field causes the particle or particles to migrate towards the first, larger surface of the capsule, causing it to take on the visual appearance of the particles. Application of a second electrical field causes the particle or particles to migrate towards the second, smaller surface, allowing the capsule to take on the visual appearance of the dispersing fluid or of a substrate or electrode positioned behind the display element. Displays may be fabricated from multiple display elements arranged on a substrate.

U.S. Pat. No. 6,177,921 (Comiskey et al.), the disclosure of which is totally incorporated herein by reference, discloses addressing schemes for controlling electronically addressable displays including a scheme for rear-addressing displays, which allows for in-plane switching of the display material. Other schemes include a rear-addressing scheme which uses a retroreflecting surface to enable greater viewing angle and contrast. Another scheme includes an electrode structure that facilitates manufacture and control of a color display. Another electrode structure facilitates addressing a display using an electrostatic stylus. Methods of using the disclosed electrode structures are also disclosed. Another scheme includes devices combining display materials with silicon transistor addressing structures.

While known compositions and processes are suitable for their intended purposes, a need remains for improved electrophoretic inks. In addition, a need remains for electrophoretic inks capable of exhibiting two or more colors. Further, a need remains for electrophoretic inks having photochromic characteristics. Additionally, a need remains for electrophoretic inks with photochromic characteristics wherein the photochromic material is thermally stable. There is also a need for electrophoretic inks with photochromic characteristics wherein both resonance forms of the photochromic material are stable. In addition, there is a need for electrophoretic inks with photochromic characteristics wherein the two resonance forms of the photochromic material are addressable at different wavelengths. Further, there is a need for electrophoretic inks with photochromic characteristics wherein both resonance forms of the photochromic material are stable for reasonable periods of time without the need for constant irradiation to maintain the resonance form.

SUMMARY OF THE INVENTION

The present invention is directed to an electrophoretic ink comprising a suspending fluid and, suspended in the suspending fluid, a plurality of particles comprising a mixture of a chelating agent and a spiropyran material of the formula

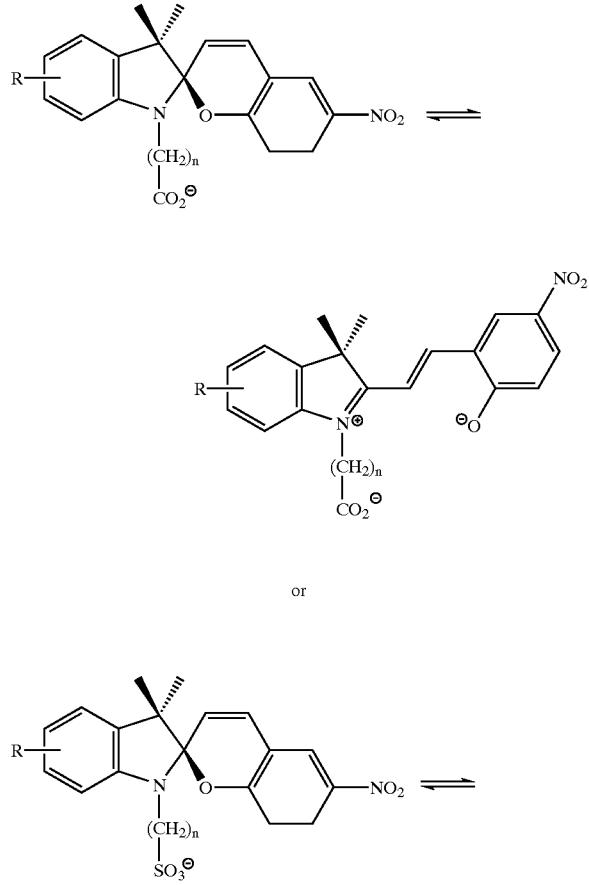

-continued

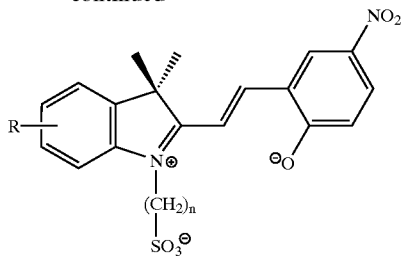

wherein n is an integer representing the number of repeat —$CH_2$— units and R is —H or —$CH=CH_2$, said particles being free to migrate within said suspending fluid under the influence of an electric field.

DETAILED DESCRIPTION OF THE INVENTION

Figure 1:
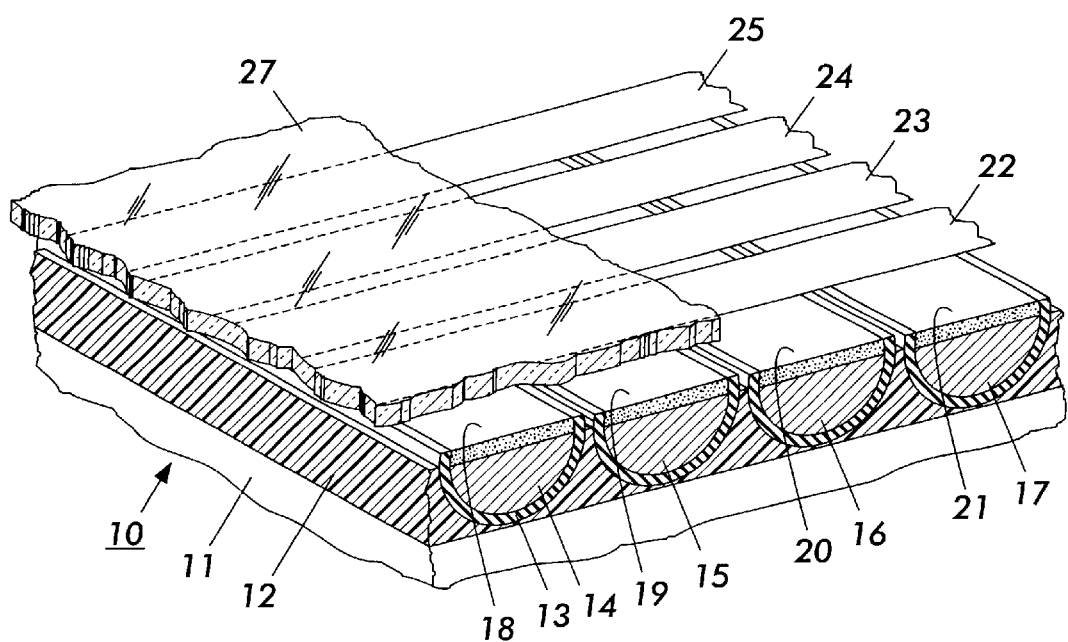
FIG. 1 depicts an isometric view of a panel segment of one example of an electrophoretic ink display suitable for the present invention showing the elements thereof.

FIG. 1 at numeral 10 illustrates a section of an electrophoretic ink display panel suitable for the present invention. It is to be understood that the panel section at 10 has been greatly magnified for the sake of explanation and illustration. Reference numeral 11 is a substrate or support means of any desired or suitable material, such as glass, polystyrene, or any other suitable nonconductor. The thickness of support 11 is not critical but it should have sufficient strength to support the elements which are mounted upon it. Support means 11 is generally planar and conductive lines 14, 15, 16, and 17 are placed thereon parallel to each other in the manner shown. The conductive lines are insulated from each other and bonded to substrate 11 by an epoxy or other adhesive 12. Each conductive line is coated with an insulating layer 13 which has been abraded to expose the top of the conductive material. Then portions of the conductive material and insulating layer are etched away so that each wire line is contained in a trough or reservoir made of the insulating material 13. The volume above the conductive material in the trough is filled with a suspending fluid or electrophoretic ink 18, 19, 20, and 21, which can contain particles of one color or a mixture of different colored particles; at least some of the particles contain a photochromic material and a chelating agent in accordance with the present invention. The suspending fluid can be clear or opaque, and can also contain a control liquid or additive for charging the particles dispersed therein. A suspending fluid containing a dye of contrasting color with the particles dissolved in a solvent dye can be employed to increase contrast. Overlying the suspending fluid and in an electrical contact therewith are transparent conductors 22, 23, 24, and 25. Lastly, a layer of transparent material 27 such as glass or the like from which side the panel is viewed overlies the transparent conductors 22, 23, 24, and 25.

The conductive material of conductive lines 14, 15, 16, and 17 can be any desired or effective electrically conductive material, such as aluminum, copper, silver, platinum, brass, steel alloys, or the like. Insulating material 13 preferably is selected so that it is capable of withstanding the etching agents used to form the trough. The transparent conductors 22, 23, 24, and 25 can comprise thin layers of tin oxide, copper oxide, copper iodide, gold, or the like either alone or on a transparent substrate.

Figure 2A:
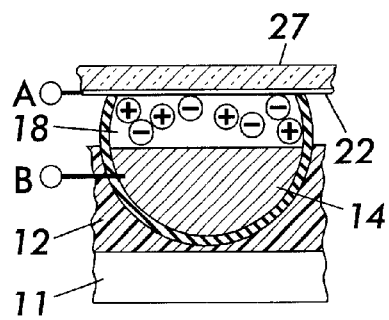
FIGS. 2A through 2D are side views of a single conductive line of the display illustrated in FIG. 1 showing the migration of charged particles when subjected to an electric field.
Figure 2B:
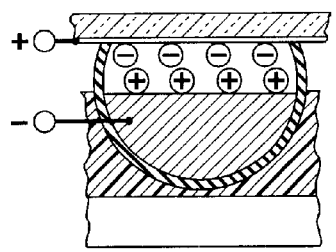
Figure 2C:
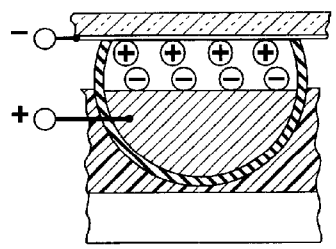

FIGS. 2A through 2C are side views of a single conductive line 14 with suspending fluid 18 having particles in suspension filling the trough or reservoir formed by insulating material 13 and conductor 14. Transparent conductor 22 overlies the trough and glass layer 27 in turn overlies the transparent conductor. In FIG. 2A the particles have been arbitrarily given polarity signs for purposes of explanation. Moreover, FIG. 2A represents the particles as being randomly dispersed within the dielectric fluid. A charge control agent or additive may or may not be needed to give the particles the desired charge, since particles can be chosen which take on an initial charge triboelectrically in the fluid. When a positive source of potential is applied to terminal A and a negative source of potential is applied to terminal B as shown in FIG. 2B, an electric field is established across the electrodes. Under the influence of the electric field, the particles having a negative charge migrate toward the positive electrode, whereas the particles having a positive charge migrate toward the negative electrode, resulting in an image which is the reverse of the other on each of the electrodes. Upon reversal of the electric field as shown in FIG. 2C, the particles.migrate to the terminal having a polarity opposite to their own. For a period of time after the removal of the electric field, the particles adhere to the electrode toward which they have migrated. To clear or erase the electrode, a potential of the same polarity as the particle is applied to the electrode. During this operation, the other electrode can be maintained at ground potential. The amount of particles adhering to the electrodes is a function of the applied voltage as well as the number of available particles.

Figure 2D:
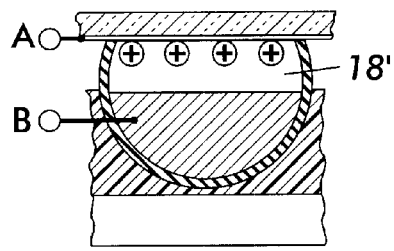

FIG. 2D shows a side view of a single conductive line such as shown in FIGS. 2A through 2C with the exception that a monochromic fluid dye 18' is utilized in lieu of one of the color particles of FIGS. 2A through 2C. In other respects FIG. 2D is identical to FIGS. 2A through 2C. Assuming that the particles in FIG. 2D have a positive polarity as shown, when a negative potential is applied to terminal A and ground to terminal B, the particles will migrate toward the upper electrode in sufficient numbers to furnish an indication of a color change in the conductive line different from its previous condition.

It is understood that FIGS. 1 and 2 represent only a portion of an actual electrophoretic color display device. In an actual display panel, the conductive lines and the transparent conductors are far more numerous, giving access to more panel coordinates. In the actual display device, numerous segments of the panel are addressed or scanned sequentially or simultaneously so as to build up visual information on the panel. The voltage to individual address terminals can also be modulated to control the brightness of the panel and to furnish degrees of contrast and resolution of visual data.

It is further understood that a solid dielectric layer can overcoat the electrodes, preventing them from contacting the suspending fluid. In such an event, the dielectric layer can serve to avoid any adverse effects that the suspending fluid may have on the electrodes (e.g. corrosion) or to furnish the required insulating properties under certain voltage conditions.

In a specific embodiment of the present invention, the suspending fluid and the particles containing the spiropyran and chelating agent according to the present invention are contained within one or more microcapsules. When microcapsules are situated in a binder or matrix, the microcapsules can be of two or more types. For example, some microcapsules can contain particles of one color while other microcapsules contain particles of another color, or some microcapsules can have a colored suspending fluid while other microcapsules have a colorless suspending fluid, or some microcapsules can contain one set of particles while other microcapsules contain two or more sets of differently colored particles, or combinations thereof, or the like.

Figure 3A:
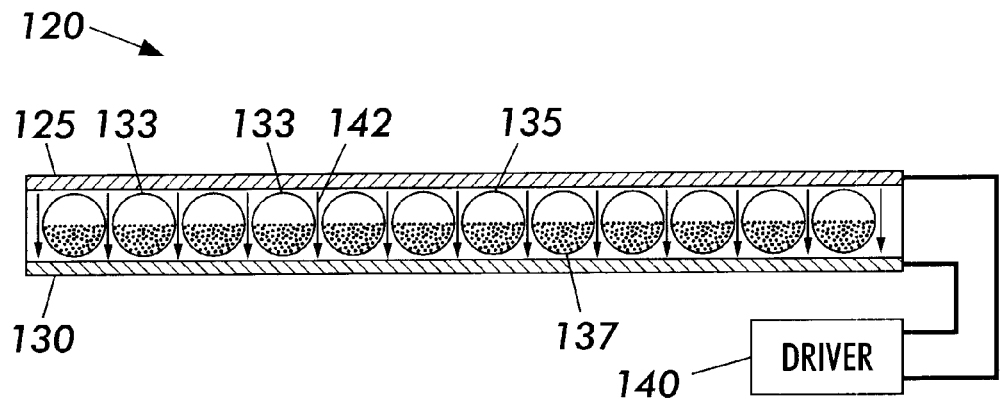
FIGS. 3A and 3B are enlarged sectional views showing microencapsulated electrophoretic display arrangements in accordance with the present invention.
Figure 3B:
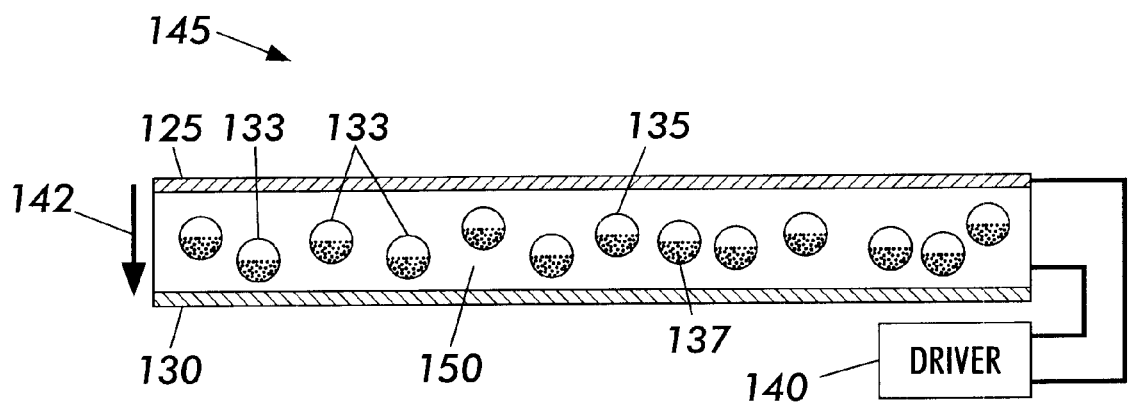

FIGS. 3A and 3B illustrate alternative embodiments of microencapsulated electrophoretic display arrangements in accordance with the present invention. In FIG. 3A, a display 120 includes a pair of planar electrodes 125 and 130 which reside on opposite sides of a substantially planar arrangement of microscopic containers, or microcapsules, 133. At least electrode 133 is visually substantially transparent so that a viewer can observe the color exhibited by portions of the microcapsules 133 adjacent to electrode 130. For example, electrode 130 can comprise a semiconductor such as indium tin oxide evaporated or otherwise coated in a thin layer onto glass, MYLAR®, or other transparent substrates; the details of fabrication are well known to those skilled in the art, as are possible semiconductor alternatives to indium tin oxide (see, for example, U.S. Pat. Nos. 3,668,106 and 4,305,807, the disclosures of each of which are totally incorporated herein by reference).

Within each microcapsule 133 is an electrophoretic suspension comprising a suspending fluid 135 and a quantity of particles 137, the suspending fluid and the particles contrasting visually (i.e., exhibiting observably distinguishable colors or shades) and the particles containing a spiropyran and a chelating agent according to the present invention. A driver circuit 140 is electrically connected to electrodes 125 and 130 and is capable of creating a sufficient potential difference between the electrodes to cause migration of particles 137 to one or the other electrode within an acceptable switching time.

To impart the color of particles 137 to the display 120, driver circuit 140 creates an electric field (indicated by arrows 142) whose direction is such that particles 137 are attracted to, and migrate toward, electrode 130. In the illustrated embodiment, microcapsules 133 are spherical and substantially tangent to one another; accordingly, if each microcapsule 133 contains a quantity of particles 137 sufficient to cover half the inner surface area under the influence of an electric field, attraction of particles 137 toward electrode 130 will impart the color of the particles to display 120 in a substantially uniform, uninterrupted manner. Microcapsules of shapes other than spherical, and dispositions of microcapsules other than substantially tangent to one another, are also suitable.

The display 120 can be formed, for example, in the manner of fabricating liquid-crystal displays. For example, after their formation, microcapsules 133 containing the suspending fluid and the particles can be injected into a cell housing two spaced-apart electrodes. Alternatively, microcapsules 130 can be "printed" into a display by any of various methods known in the art, such as the techniques used to deposit pressure-rupturable microcapsules onto a substrate to create carbonless copy paper; in this case, the microcapsules are printed onto one of the electrodes 125 or 130, after which the other electrode is deposited, printed, or otherwise coated on top of the deposited microcapsules.

In an alternative embodiment 145, illustrated in FIG. 3B, microcapsules 133 are immobilized within a transparent matrix or binder 150 that is itself sandwiched between electrodes 125 and 130. Once again, application of the appropriately directed electric field results in migration of particles 137 toward transparent electrode 130. So long as microcapsules 133 are dispersed within matrix 150 uniformly and at sufficient density, the resulting visual appearance will be uniform. Matrix 150 is preferably a transparent polymeric material that can be cured (i.e., cross-linked from a low-viscosity state into extremely high viscosity) or otherwise solidified at relatively low temperatures, and which readily accepts, in its low-viscosity state, a dispersion of microcapsules. Useful materials include polyvinyl alcohols, gelatins, epoxies, and other resins.

The low-viscosity polymer precursor, into which microcapsules 133 have been suspended at an adequate dispersion density, can be cured in a mold conforming to the two-dimensional or curved shape of electrodes 125 and 130, or can instead utilize the electrodes as containment boundaries for an in-situ cure.

Alternatively, microcapsules 133 can be voids or microscopic cavities in matrix 150 formed during its cure. For example, the electrophoretic ink comprising the suspending fluid and the particles can be dispersed as an emulsion in the uncured (low-viscosity) precursor to matrix 150; curing of the precursor leaves the emulsion droplets suspended and immobilized within the matrix, effectively forming a polymer-dispersed electrophoretic display.

The display can be arranged in any number of configurations, including a unitary, continuous display (i.e., a contiguous extent of microcapsules sandwiched between a single electrode pair); a row or other pattern of discrete groups of microcapsules controlled by a single electrode pair; or multiple-element arrangements containing a plurality of independently addressable display elements, each controlled by a separate electrode pair and comprising, for example, a single continuous display or a pattern of microcapsule groups. Driver 140 can be any suitable power supply, e.g., a DC or pulsed DC circuit, or an AC circuit (where the pulse width or AC period is greater than the switching time of the electrophoretic composition).

Figure 4:
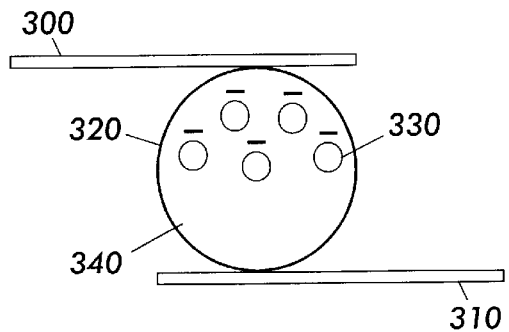
FIG. 4 is an enlarged cross-section of a microcapsule containing particles of a single type of color.

FIG. 4 shows an electrophoretic microcapsule containing particles of a single type or color. A transparent electrode 300 and a rear electrode 310 can be selectively and oppositely biased such that a quantity of charged, colored particles 330 comprising a spiropyran and a chelating agent according to the present invention contained within the microcapsule 320 translate either toward or away from one of the electrodes through the dyed suspending fluid 340. In one such configuration, particles 330 are drawn toward transparent electrode 300, rendering them visible. In the opposite configuration, particles 330 are drawn toward rear electrode 310, causing them to be obscured by dyed suspending fluid 340.

Figure 5A:
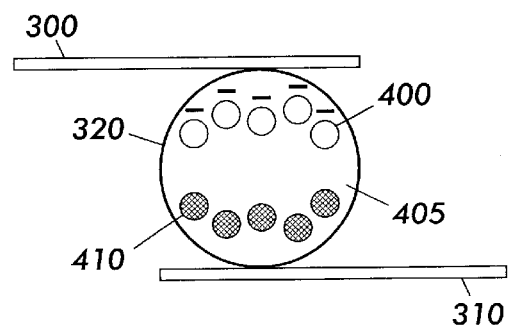
FIGS. 5A and 5B are enlarged cross-sections of microcapsules containing particles of multiple types or colors.
Figure 5B:
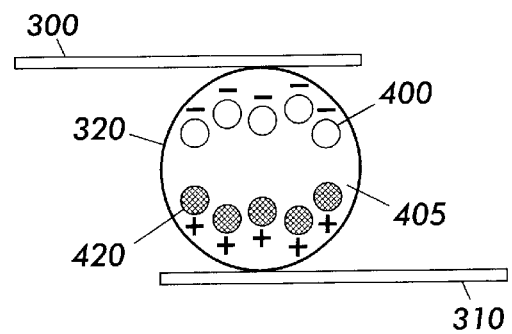

FIGS. 5A and 5B show electrophoretic microcapsules containing particles of multiple types or colors. With reference to FIG. 5A, electrophoretic microcapsule 320 contains a suspending fluid 405 in which are dispersed a quantity of charged particles 400 of one color containing a spiropyran or chelating agent according to the present invention and a similar quantity of uncharged particles 410 of a different or visually contrasting color. Transparent electrode 300 and rear electrode 310 can be biased such that charged, colored particles 400 are translated either toward electrode 300, in which case their color predominates; or toward electrode 310, in which case the color of particles 410 predominates (since particles 400 are hidden beneath particles 410). In this embodiment, the spiropyran and chelating agent can be contained in either the charged particles 400 as shown or in the uncharged particles 410. Alternatively, as illustrated in FIG. 5B, particles 400 and differently colored particles 420 can carry opposite charges, creating a push-pull effect that enhances the visibility of particles attracted to electrode 300 and reduces visual interference from the other particles. As another alternative, the different sets of particles can have the same charge sign but different charge magnitudes. In all of these embodiments, the electrophoretic mobility of particles 400 and particles 420 are substantially different. By "substantially different" as used herein is meant that less than about 25 percent, and preferably less than about 5 percent, of the particles of one color have the same or similar electrophoretic mobilities as the particles of the other color.

Figure 6:
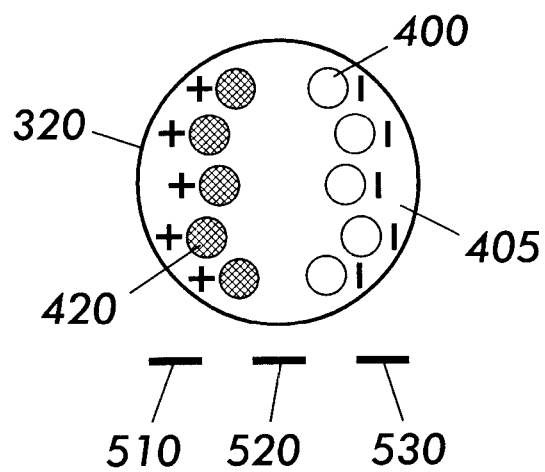
FIG. 6 is a schematic, sectional depiction of a rear-addressed electrophoretic display system.

FIG. 6 illustrates a system that does not require a top transparent electrode 300, and is therefore termed a "rear-addressed" systems. Three electrodes 510, 520, and 530 lie in a substantially coplanar orientation with respect to a microcapsule 320, or can be closely spaced to one another around the exterior surface of the microcapsule. A potential applied to one of the electrodes will induce an opposite charge in the other electrodes, so long as the other electrodes are effectively connected to the ground return of the driven electrode. Microcapsule 320 contains quantities of oppositely charged and differently colored particles 400 and 420, wherein one of 400 and 420 contains a spiropyran and chelating agent according to the present invention. If electrode 510 is biased negatively, electrodes 520 and 530 are correspondingly biased positively relative to electrode 510; accordingly, particles 400 and 420 will be oriented in the manner illustrated. By successively biasing electrode 520 and then electrode 530 negatively, particles 420 will be drawn across the bottom of microcapsule 320, adjacent to the plane of the electrodes, forcing microcapsules 400 toward the upper region of the microcapsule; effectively, the particles 420 are commutated along the path defined by electrodes 510, 520, and 530. A similar procedure with positive instead of negative bias will cause the opposite color orientation.

Figure 7:
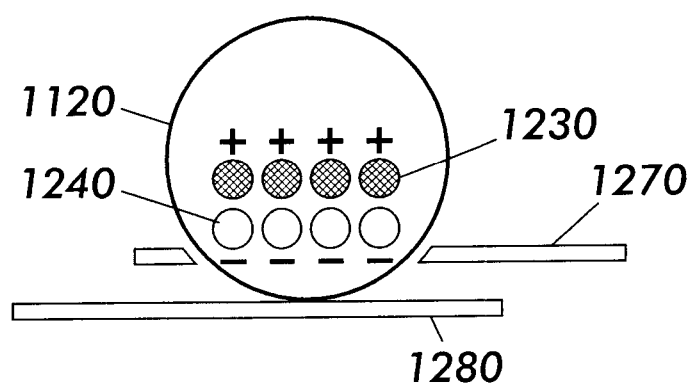
FIG. 7 is a schematic representation of another rear-addressed electrophoretic display system.

FIG. 7 illustrates another example of a "rear-addressed" system. As illustrated in FIG. 7, a microcapsule 1120 contains positively charged particles of one color 1230 and negatively charged particles of another color 1240, wherein one of 1230 and 1240 contains a spiropyran and chelating agent according to the present invention, such that application of an electric field to electrodes 1270 and 1280 causes a migration of the one color or the other color, depending on the polarity of the field, toward the surface of the microcapsule and thus effecting a perceived color change. Such a system is viewed from above, and electrodes 1270 and 1280 can thus be opaque and do not affect the optical characteristics of the display.

Additional examples of rear-addressed systems are disclosed in, for example, U.S. Pat. Nos. 6,067,185 and 6,172,798, the disclosures of each of which are totally incorporated herein by reference.

In the embodiments of the present invention wherein the suspending liquid and the particles are contained within microcapsules and the microcapsules are situated in a binder or matrix, the binder containing the microcapsules can be deposited onto a variety of substrates, including nonplanar substrates. The binder containing the microcapsules can be applied to a substrate uniformly, or it can be applied in an image pattern. Further, the binder containing the microcapsules can be manufactured into strings and threads suitable for weaving into textiles.

The present invention also encompasses encapsulated electrophoretic ink displays wherein the suspending fluid containing the particles is directly dispersed or emulsified into a binder (or a precursor to the binder material) to form what can be called a "polymer-dispersed electrophoretic display". In such displays, the individual electrophoretic phases can be referred to as "capsules" or "microcapsules" even though no capsule membrane is present. Such polymer-dispersed electrophoretic displays are considered to be subsets of encapsulated electrophoretic displays.

Any other configuration of electrophoretic display can be employed with the electrophoretic inks of the present invention, including (but not limited to) those illustrated in U.S. Pat. Nos. 3,612,758, 5,930,026, 5,961,804, 6,017,584, 6,067,185, 6,118,426, 6,120,588, 6,120,839, 6,124,851, 6,130,773, 6,130,774, 6,172,798, and 6,177,921, the disclosures of each of which are totally incorporated herein by reference.

Examples of suitable suspending fluids include aliphatic hydrocarbons, such as pentane, hexane, cyclohexane, decane, dodecane, tetradecane, pentadecane, hexadecane, paraffinic hydrocarbons such as the isoparaffinic ISOPAR® G, ISOPAR® H, ISOPAR® K, ISOPAR® L, ISOPAR® M, and ISOPAR® V, and the normal paraffinic NORPAR® 12, NORPAR® 13, NORPAR® 15, and NORPAR® 16, all available from Exxon Corporation, and the like, aromatic hydrocarbons, such as toluene, naphthalene, xylene, and the like, other hydrocarbons such as kerosene, naphtha, and gasoline, halogenated hydrocarbons, such as tetrachloroethylene, carbon tetrachloride, tetrafluorodibromoethylene, trifluorochloroethylene, 1,2,4-trichlorobenzene, and the like, halogen-containing polymers such as poly(chlorotrifluoroethylene), siloxanes, such as dimethyl polysiloxane, octamethyl cyclosiloxane and higher molecular weight cyclic siloxanes, poly(methyl phenyl siloxane), hexamethyldisiloxane, and the like, materials disclosed as suitable curable liquid vehicles in U.S. Pat. Nos. 5,364,726 and 5,334,699, the disclosures of each of which are totally incorporated herein by reference, and the like, as well as mixtures thereof.

If desired, the suspending fluid can optionally contain an optically absorbing dye. Any desired or suitable dye can be employed. Specific examples of suitable dyes include the Oil Red dyes, the Sudan Red and Sudan Black series of dyes, the Oil Blue dyes, the Macrolex Blue series of dyes, Michler's hydrol, Malachite Green, Crystal Violet, Auramine O, ORASOL BLUE 2GLN, ORASOL RED G, ORASOL YELLOW 2GLN, ORASOL BLUE GN, ORASOL BLUE BLN, ORASOL BLACK CN, and ORASOL BROWN CR, all available from Ciba, MORFAST BLUE 100, MORFAST RED 101, MORFAST RED 104, MORFAST YELLOW 102, MORFAST BLACK 101, and MORFAST BLACK 108, all available from Morton Chemical Company, BISMARK BROWN R, available from Aldrich, NEOLAN BLUE, available from Ciba, SAVINYL YELLOW RLS, SAVINYL BLACK RLS, SAVINYL RED 3GLS, and SAVINYL PINK GBLS, all available from Sandoz, and the like, as well as mixtures thereof. When present, the optional dye is present in the suspending fluid in any desired or effective amount, typically at least about 0.01 percent by weight of the suspending fluid, preferably at least about 0.05 percent by weight of the suspending fluid, and typically no more than about 1 percent by weight of the suspending fluid, preferably no more than about 0.5 percent by weight of the suspending fluid, although the amount of dye can be outside of these ranges.

If desired, an optional charge control agent or additive can be added to the particle suspension to increase particle charge in suspension or make more of the particles charge to one polarity. Examples of suitable charge control agents include (but are not limited to) linseed oil; alkyd resins; polyamide resins such as VERSAMID®; polyethylene; shellac; organic sulfates and sulfonates, including (but not limited to) bis(2-ethyl hexyl) sodium sulfosuccinate, sodium dihexyl sulfosuccinate, sodium dioctyl sulfosuccinate, calcium dodecyl benzene sulfonate, calcium petroleum sulfonate, neutral or basic barium dinonylnaphthalene sulfonate, neutral or basic calcium dinonylnaphthalene sulfonate, dodecylbenzenesulfonic acid sodium salt, ammonium lauryl sulfate, and the like; basic or neutral barium petronate; calcium petronate; the cobalt, calcium, copper, manganese, nickel, zinc, and iron salts of naphthenic acid; the barium, aluminum, zinc, copper, lead, chromium, calcium, and iron salts of stearic acid; the lithium, cadmium, calcium, manganese, magnesium, and zinc salts of heptanoic acid; the barium, aluminum, cobalt, manganese, zinc, cerium, and zirconium salts of 2-ethyl hexanoic acid (these are known as metal octoates); aluminum diisopropyl salicylate; aluminum t-butyl salicylate; aluminum resinate; aluminum salts of 3,5 di-t-butyl gamma resorcylic acid; block and comb copolymers, including (but not limited to) AB diblock copolymers of (A) polymers of 2-(N,N)-dimethylaminoethyl methacrylate quaternized with methyl-p-toluenesulfonate and (B) poly-2-ethylhexyl methacrylate, comb graft copolymers with oil soluble tails of poly (12-hydroxystearic acid) and having a molecular weight of about 1800 pendant on an oil-soluble anchor group of poly (methyl methacrylate-methacrylic acid), and the like; organic amides, including (but not limited to) polyisobutylene succinimides such as OLOA 1200, N-vinyl pyrrolidone polymers, and the like; organic zwitterions, including (but not limited to) lecithin and the like; organic phosphates and phosphonates, including (but not limited to) the sodium salts of phosphated mono- and di-glycerides with saturated and unsaturated acid substituents, and the like; and the like, as well as mixtures thereof. Charge adjuvants such as stearates, metallic soap additives, polybutylene succinimides, and the like are also described in references such as U.S. Pat. Nos. 4,707,429, 4,702,984, and 4,702,985, the disclosures of each of which are totally incorporated herein by reference. When present, the optional charge control agent is present in the electrophoretic ink in any desired or effective amount, typically at least about 0.001 percent by weight of the electrophoretic ink, and preferably at least about 0.01 percent by weight of the electrophoretic ink, and typically no more than about 3 percent by weight of the electrophoretic ink, and preferably no more than about 0.8 percent by weight of the electrophoretic ink, although the amount can be outside of these ranges.

In non-aqueous solutions, some surface active materials used as charge control additives are often amphoteric in that the charge they impart to a surface depends upon a balance between the properties of the charge control additive and the surface constituents of the particle. For example, lecithin, a common charge control additive, will charge some particles positively and some particles negatively, depending upon the reactivity of the particle surface. Thus, it is possible to impart opposite charges to different colored particles in the same suspending fluid with the same charge control additive, provided that the surfaces of the two sets of particles are properly chosen. When stabilizing polymers are employed to provide the necessary functional groups on the surfaces of the particles, the layer of stabilizer can have a thickness of from about 10 to about 1,000 Angstroms, and preferably from about 40 to about 200 Angstroms. Suitable stabilizing polymers include poly(2-ethylhexylmethacrylate), poly (isobutylene), polypropylene, and the like. Stabilizer materials can also be added to the electrophoretic ink containing both positively charged particles and negatively charged particles to prevent excessive flocculation of the particles caused by the mutual attraction that results from their opposite polarities. Although the positive and negative particles will frequently flocculate in the absence of a field, their mutual attraction can be weakened by means of stabilizers, so that they will separate when in the presence of the electric field. Specific stabilizers include polymeric materials that are soluble in the suspending fluid. These polymers are attached to the surfaces of the particles by means of covalent bonds or by physical adsorption. When the particles are composed solely of pigment particles, the stabilizers attach directly thereto; when the particles comprise both resin and pigment components, the stabilizers will generally be attached to the resin materials within the particles. In addition, the stabilizer material can comprise one component soluble in the suspending fluid, which component is attached to a second component capable of attaching to the particle; for example, a stabilizer can consist of a block copolymer, in which one block constitutes the component soluble in the suspending fluid and the other block constitutes the portion capable of attaching to the particle. Examples of such polymers include SOLSPERSE polymers available from ICF, CRAYTON G701 polymers available from Shell Chemical Company, and poly(styrene-b-butylene). In either case, in the suspending fluid, the polymer molecules extend to form long chains as a result of the solvation forces, or the attraction of the solvent molecules to the polymers. Provided that these polymer chains are of sufficient length, they act as steric stabilizers, and create a repulsive barrier that maintains a sufficient distance between the particles to prevent flocculation when the electrophoretic ink is under the influence of an electric field. Additional examples of suitable polymeric materials include polydimethylsiloxane, poly(vinyl toluene), poly(2-ethylhexylmethacrylate-g-N-vinyl-2-pyrrolidone), poly(2-ethylhexyl acrylate-g-ethyl acrylate), and the like. In some instances, the same material can act as both the steric stabilizer and as the charge control additive. Examples of such materials are OLOA 1200 and lecithin. The polymers can have a molecular weight of from about 10,000 to about 100,000 to ensure that the chains are of sufficient length to separate the particles. Further details concerning particles having stabilizing copolymers attached thereto and processes for making the same are disclosed in U.S. Pat. No. 4,476,210, the disclosure of which is totally incorporated herein by reference. Compositions comprising oppositely charged electrophoretically moveable particles of different colors suspended in a liquid medium are also disclosed in, for example, U.S. Pat. Nos. 4,877,698, 4,830,945, and 4,880,720, the disclosures of each of which are totally incorporated herein by reference.

When the electrophoretic ink of the present invention is microencapsulated and the microcapsules are dispersed within a binder, examples of suitable binder materials include elastomers, such as SYLGARD® 184, available from Dow Corning, Midland, Mich., Stauffer and Wacker V-53 elastomer; acrylics; polyvinylalcohols; polyvinylacetates; polyurethanes; polysaccharides, including cellulose and cellulose derivatives; gelatin arabic; gum arabic; polyamides; urea-formaldehyde resins; melamine-formaldehyde resins; N-methyl pyrrolidone; N-vinyl pyrrolidone; poly-2-hydroxyethylacrylate; latex compositions, typified by the Neorez® and Neocryl® resins (Zeneca Resins), Acrysol® (Rohm and Haas), Bayhydrol® (Bayer), and the Cytec Industries HP line, including latices of polyurethanes, occasionally compounded with one or more of the acrylics, polyesters, polycarbonates or silicones; epoxies; polyesters; and the like, as well as mixtures thereof. After the microcapsules have been dispersed within the liquid binder, the binder is cured by any desired or effective method, such as application of heat, radiation, chemical curing, or the like. One example of a specific process for providing electrophoretic microcapsules dispersed within a binder is disclosed in U.S. Pat. No. 6,067,185, the disclosure of which is totally incorporated herein by reference.

Microcapsules containing the suspending fluid and the photochromic particles can be made by any desired or suitable process. For example, methods for preparing microcapsules are disclosed in, for example, U.S. Pat. Nos. 4,087,376, 4,001,140, 4,273,672, 5,961,804, 2,800,457, 5,604,027, "Polymer-Encapsulated Particles with Controlled Morphologies: Preparation, Characterization and Application", Wei-Hsin Hou, Ph.D. Thesis, Lehigh University, 1991, UMI Disseration Service, University Microfilms International, Ann Arbor, Mich., and *Microcapsule Processing and Technology*, Asaji Kondo, Marcel Dekker, Inc. (1979), the disclosures of each of which are totally incorporated herein by reference.

The electrophoretic inks of the present invention contain a spiropyran material of the formula

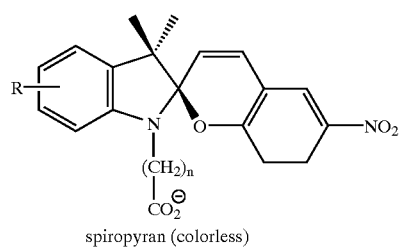
spiropyran (colorless)

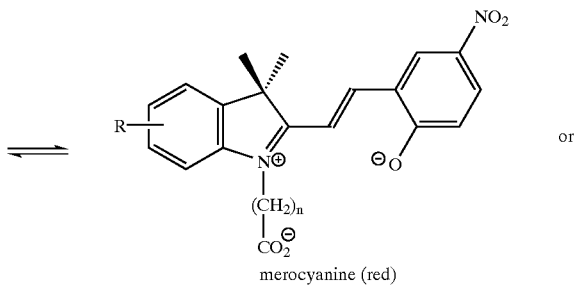
merocyanine (red)

or

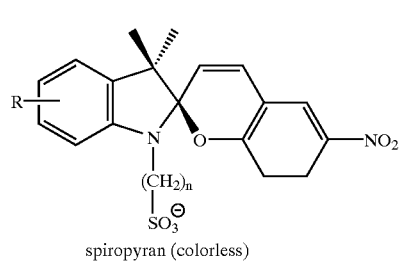
spiropyran (colorless)

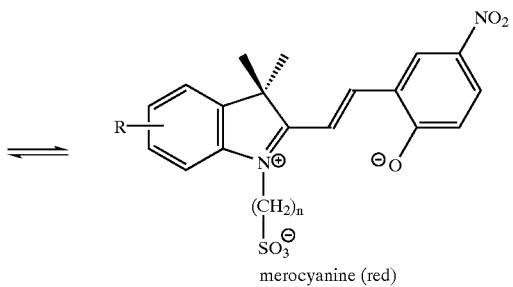
merocyanine (red)

wherein n is an integer representing the number of repeat —$CH_2$— units, typically being from about 2 to about 8, although the value of n can be outside of this range, and R is —H or —CH=$CH_2$. The anionic —COO— and —$SO_3$— groups are, of course, accompanied by cations. Any desired or suitable cations can be employed. Materials of the formula

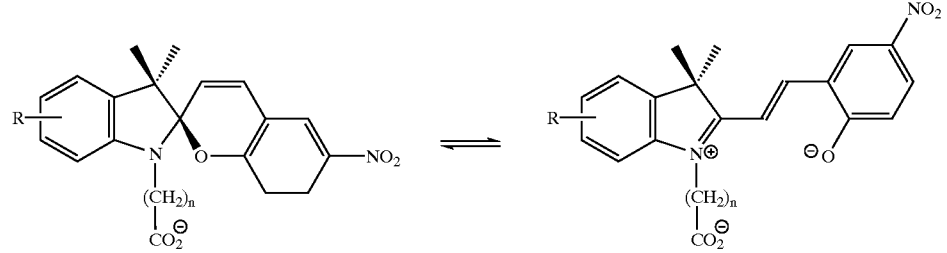

can be prepared by the reaction of 2,3,3-trimethylindolenine with β-iodopropionic acid, followed by condensation with 5-nitrosalicaldehyde in the presence of triethylamine. Materials of the formula

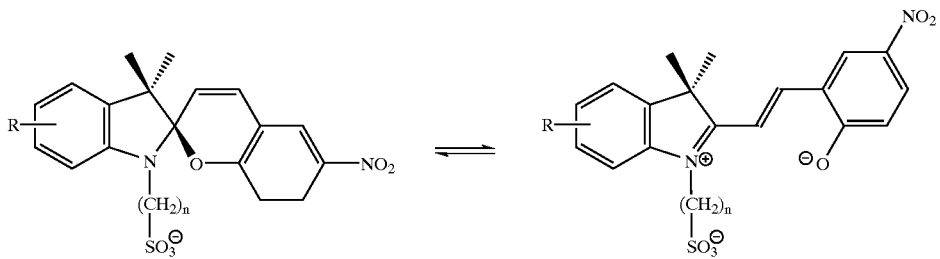

can be prepared by the reaction of 2,3,3-trimethylindolenine with γ-sulfone, followed by condensation with 5-nitrosalicaldehyde in the presence of triethylamine. The spiropyran can be present in the particles in the electrophoretic ink in any desired form, including (but not limited to) as a coating covering the particles, as a dispersion within the core material of the particles, or the like. When dispersed within the particles, the spiropyran is present in the particles in any desired or effective amount, typically at least about 0.01 percent by weight of the particles, and typically no more than about 1 percent by weight of the particles, although the amount can be outside of this range. When coated onto the particle surfaces, the spiropyran is present on the particles in any desired or effective thickness, typically at least about 50 nanometers, and typically no more than about 150 nanometers, although the amount can be outside of this range.

The particles containing the photochromic spiropyran can be polymeric particles in which the photochromic spiropyran and chelating agent have been dissolved or dispersed. Typically, the polymer is relatively insoluble in the suspending fluid. Preferably, the polymer is soluble in the suspending fluid in amounts of about 5 percent by weight or less of the liquid vehicle at ambient temperature (generally from about 20 to about 30° C.). Examples of suitable polymers include polystyrene, polyethylene, polypropylene, phenolic resins, Du Pont ELVAX® resins (ethylene-vinyl acetate copolymers), polyesters, polyacrylates, polymethacrylates, Du Pont NUCREL® resins (copolymers of ethylene and α,β-unsaturated acids such as ethylene-acrylic acid or ethylene-methacrylic acid copolymers wherein the acid moiety is present in an amount of from about 0.1 to about 20 percent by weight of the copolymer), ethylene-ethyl acrylate copolymers, acrylic copolymers and terpolymers, methacrylate resins such as polybutyl methacrylate, polyethyl methacrylate, and polymethyl methacrylate, polybutyl terephthalates, others as disclosed in, for example, British Patent 2,169,416, U.S. Pat. Nos. 5,759,729, and 4,794,651, the disclosures of each of which are totally incorporated herein by reference, and the like, as well as mixtures thereof. Polymer particles containing the photochromic spiropyran and the chelating agent can be made by any suitable process, such as by a method employing an attritor, as disclosed in, for example, U.S. Pat. Nos. 5,123,962, 5,053,306, and 5,168,022, the disclosures of each of which are totally incorporated herein by reference, or a method employing a microfluidizer, as disclosed in, for example, U.S. Pat. No. 4,783,389, the disclosure of which is totally incorporated herein by reference, or a method employing a piston homogenizer, as disclosed in U.S. Pat. No. 5,387,489, the disclosure of which is totally incorporated herein by reference, or the like.

The photochromic material is present in the particles, and the particles are contained in the electrophoretic ink, in any amount effective to impart to the electrophoretic ink the desired color and intensity under the appropriate light conditions. The photochromic material is present in the particles typically in an amount of at least about 1 percent by weight of the particles, and preferably at least about 5 to about 10 percent by weight of the particles, and typically in an amount of no more than about 20 percent by weight of the particles, and preferably no more than about 10 percent by weight of the particles, although the amount can be outside of these ranges. Typically, the particles are present in the electrophoretic ink in an amount of at least about 1 percent by weight of the electrophoretic ink, and preferably at least about 5 to about 10 percent by weight of the electrophoretic ink, and typically in an amount of no more than about 20 percent by weight of the electrophoretic ink, and preferably no more than about 10 percent by weight of the electrophoretic ink, although the amount can be outside of these ranges.

When particles of two or more different colors are used in the electrophoretic ink, examples of suitable particle materials for those particles other than the ones containing the photochromic material according to the present invention include (but are not limited to) laked pigments, scattering pigments, absorbing pigments, luminescent particles, reflective particles, retroreflective particles, transparent particles, and the like. Specific examples of suitable particle materials for those particles other than the ones containing the photochromic material according to the present invention include (but are not limited to) barium sulfate, cadmium red, cadmium sulfo-selenide, calcium silicates, chromium oxide, iron oxides, lead chromate, manganese dioxide, selenium (arsenic doped), silicon monoxide, sulfur, vermilion red, zinc oxide, zinc sulfide, zirconium oxide, lead chromate, kaolin, titania (including rutile and anatase, both of which can be coated in one or two layers with a metal oxide, such as aluminum oxide, silicon oxide, or the like), metal particles, carbon black, anthracenes, phthalocyanines, diarylide yellow, hansa yellow, benzidin yellow, commercially available pigments such as Cyan Blue GT 55-3295 (American Cyanamid), Cibacron Black BG (Ciba), Cibacron Turquoise Blue G (Ciba), Cibalon Black BGL (Ciba), Orasol Black BRG (Ciba), Orasol Black RBL (Ciba), Acetamine Blac, CBS (DuPont), Crocein Scarlet N Ex (DuPont), Fiber Black VF (DuPont), Luxol Fast Black L (DuPont), Nirosine Base No. 424 (DuPont), Oil Black BG (DuPont), Rotalin Black RM (DuPont), Sevron Brilliant Red 3 B (DuPont), Basic Black DSC (Dye Specialties, Inc.), Hectolene Black (Dye Specialties, Inc.), Azosol Brilliant Blue B (GAF), Azosol Brilliant Green BA (GAF), Azosol Fast Brilliant Red B (GAF), Azosol Fast Orange RA Conc. (GAF), Azosol Fast Yellow GRA Conc. (GAF), Basic Black KMPA (GAF), Benzofix Black CW-CF (GAF), Cellitazol BNFV Ex Soluble CF (GAF), Celliton Fast Blue AF Ex Conc (GAF), Cyper Black IA (GAF), Diamine Black CAP Ex Conc (GAF), Diamond Black EAN Hi Con. CF (GAF), Diamond Black PBBA Ex (GAF); Direct Deep Black EA Ex CF (GAF), Hansa Yellow G (GAF); Indanthrene Black BBK Powd. (GAF), Indocarbon CLGS Conc. CF (GAF), Katigen Deep Black NND Hi Conc. CF (GAF), Rapidogen Black 3 G (GAF), Sulphone Cyanine Black BA-CF (GAF), Zambezi Black VD Ex Conc. (GAF), Rubanox Red CP-1495 (Sherwin-Williams), Raven 11 (Columbian Carbon Company), Statex B-12 (Columbian Carbon Co.), chrome green, Peacock Blue Lake (Cl Pigment Blue 24), Persian Orange (lake of Cl Acid Orange 7), Black M Toner (GAF), and the like, as well as mixtures thereof. Also suitable are dyed particles and pigment/polymer composites; examples of suitable polymers for these types of particles include those listed hereinabove as being suitable for polymeric particles containing the photochromic spiropyran. The optional particles in the electrophoretic ink in addition to the particles containing the spiropyran, when present, are contained in the electrophoretic ink in any amount effective to impart to the electrophoretic ink the desired color and intensity under the appropriate light conditions. Typically, the optional additional particles are present in the electrophoretic ink in an amount of at least about 1 percent by weight of the electrophoretic ink, and preferably at least about 5 to about 10 percent by weight of the electrophoretic ink, and typically in an amount of no more than about 20 percent by weight of the electrophoretic ink, and preferably no more than about 10 percent by weight of the electrophoretic ink, although the amount can be outside of these ranges.

The electrophoretic inks of the present invention also contain a chelating agent with which the merocyanine form of the spiropyran can chelate to stabilize this form of the molecule. The chelating agent is admixed with the spiropyran compound in the electrophoretic ink. Examples of suitable chelating agents include metal salts in the +2 state, such as $Ca^{2+}$, $Zn^{2+}$, $Mg^{2+}$, transition metals, and the like, wherein the accompanying anion or anions are such that the metal salt is water soluble, such as nitrate, chloride, bromide, and the like. The chelating agent is present in the electrophoretic ink in any desired or effective amount, typically in a molar ratio to the spiropyran of at least about 1 mole of chelating agent for every 1 mole of spiropyran, preferably at least about 2 moles of chelating agent for every 1 mole of spiropyran, more preferably at least about 3 moles of chelating agent for every 1 mole of spiropyran, and even more preferably at least about 5 moles of chelating agent for every 1 mole of spiropyran, and typically no more than about 10 moles of chelating agent for every 1 mole of spiropyran, although there is no upper limit on the amount of chelating agent that can be present, and although the amount of chelating agent can be outside of these ranges.

The particles containing the spiropyran are photochromic in that they have a first state corresponding to a first absorption spectrum and a second state corresponding to a second absorption spectrum. The photochromic shift from the first state to the second state can be effected by any method suitable for the photochromic spiropyran material. Examples of methods for inducing the photochromic shift include irradiation with radiation of a suitable wavelength, typically from about 190 to about 425 nanometers, although the wavelength can be outside this range. The reverse photochromic effect can be induced by irradiation with visible light, typically in the wavelength range of from about 425 to about 700 nanometers, although the wavelength can be outside this range, or by the application of heat. By exposing the particles of the present invention to radiation of the appropriate wavelength, the particles having the spiropyran therein or thereon can be switched from one color to another, either in imagewise fashion by imagewise exposure to radiation or uniformly by uniform exposure to radiation.

Another embodiment of the present invention is directed to a display which comprises (a) an electrophoretic ink according to the present invention, wherein at least some of the particles in said ink have either a positive polarity or a negative polarity, (b) at least one first electrode, (c) at least one second electrode, and (d) means for selectively applying an electrical field between said at least one first electrode and said at least one second electrode, whereby said particles having either a positive polarity or a negative polarity migrate through said enabling fluid toward an electrode having a polarity opposite to their own. As used in the specification and claims herein, the "means for selectively applying an electric field" can be considered any apparatus which is capable of establishing a field between any pair of electrodes at any time and for any duration. As such, the means for applying a field can include, for example, conductive members which at any time physically associate the electrodes with any apparatus which includes a power supply. The means for applying a field can include a computer processor, or computer-processor-like device such as a digital camera, which is capable of processing image data and applying a field to any pair of electrodes in response to receiving or processing such image data. The means for applying the field can include a device permanently associated with any electrodes, or else the electrodes or any part of the display can be designed to be readily separable from the means for selectively applying the field.

Yet another embodiment of the present invention is directed to a process which comprises (a) providing an electrophoretic ink according to the present invention, wherein at least some of the particles in said ink have either a positive polarity or a negative polarity; (b) applying to the display in an imagewise pattern an electrical field, thereby causing said particles having either a positive polarity or a negative polarity to migrate through said suspending fluid in an imagewise pattern; and (c) exposing said display to radiation at a wavelength effective to cause the spiropyran material in the particles to shift to a merocyanine form. In a specific embodiment, subsequent to step (c), the display is exposed to radiation at a wavelength effective to cause at least some of the particles containing the material in the merocyanine form to shift back to the spiropyran.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

Preparation of Carboxylate and Sulfonate Substituted Spiropyran Salts

Step 1: Synthesis of 2,3,3-trimethylindolinium salts

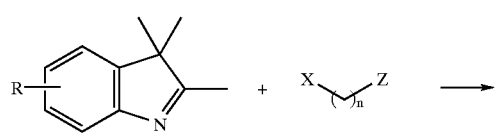

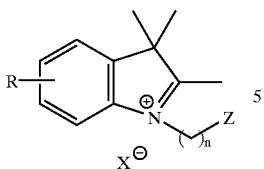

Because of the relatively weak nucleophilicity of 2,3,3-trimethylindolenine (where R is hydrogen) or its vinyl derivative 2,3,3,8-vinyl tryimethylindolenine (where R is vinyl), the syntheses of 2,3,3-trimethylindolinium salts were conducted either in the absence of any solvent or with a dipolar aprotic solvent (nitromethane) at 100° C.

Vinyl containing indolenine precursors can be prepared by Friedel-Crafts acylation of the precursors for the preparation of polymerizable spiropyrans. Alternatively, Friedel-Crafts acylation of the spiropyrans can be carried out. A general synthetic route to these materials is disclosed in, for example, G. K. Hamer, I. R. Peat, and W. F. Reynolds, "Investigations of Substituent Effects by Nuclear Magnetic Resonance Spectroscopy and All-Valence Electron Molecular Orbital Calculations. I. 4-Substituted Styrenes," *Can. J. Chem.*, Vol. 51, 897–914 (1973) and G. K. Hamer, I. R. Peat, and W. F. Reynolds, "Investigations of Substituent Effects by Nuclear Magnetic Resonance Spectroscopy and All-Valence Electron Molecular Orbital Calculations. II. 4-Substituted α-Methylstyrenes and α-t-Butylstyrenes," *Can. J. Chem.*, Vol. 51, 915–926 (1973), the disclosures of each of which are totally incorporated herein by reference, and is outlined below.

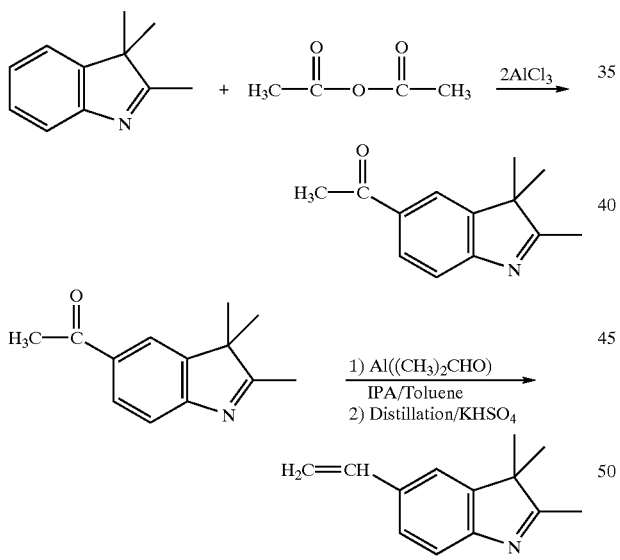

Alkylating agents that can be used in this reaction (all available from Aldrich Chemical Co., Milwaukee, Wis.) are 3-iodopropionic acid, ethyl 5-bromopentanoate, 6-bromohexanoic acid, 1,3-propylsulfone, and 1,4-butylsulfone. The choice of these reagents ensures that competing ring-formation and/or acid-base reactions are minimal to allow for nucleophilic attack of the sp2-N,

IA

Synthesis of N-(2-carboxyethyl)-2,3,3-trimethylindolinium Iodide

The general procedure for the preparation of the 2,3,3-trimethylindolinium salt intermediates is illustrated through the reaction of 2-iodopropionic acid and 2,3,3-trimethylindolenine. Vinyl containing intermediates can also be prepared from the N-(2-carboxyethyl)-2,3,3-trimethyl indolinium iodide.

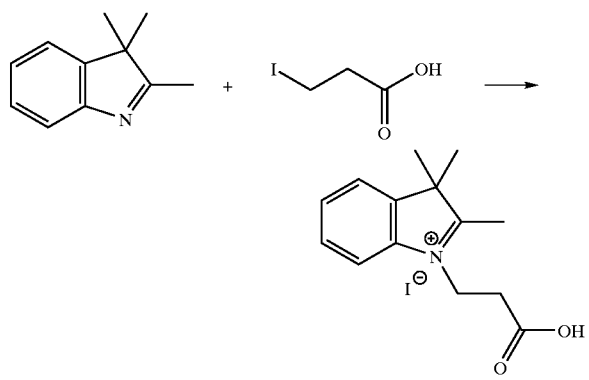

A 2-necked 50 milliliter round-bottomed flask equipped with a magnetic stirring bar and an argon inlet was charged with re-distilled (pressure 2 mm Hg, temperature 45° C.) 2,3,3-trimethylindolenine (7.95 grams, 50.0 mmol) and 3-iodopropionic acid (2.00 grams, 10 mmol). The mixture was heated to 80° C. for 12 hours, during which time the product precipitated out of solution and formed a highly viscous medium. Upon cooling, the reaction mixture was extracted three times with 200 milliliter portions of diethyl ether to remove all of the unreacted starting material. The remaining crystalline solid was then dissolved in 10 milliliters of water, extracted three times with 50 milliliter portions of diethyl ether, and extracted three times with 25 milliliter portions of $CHCl_3$. The aqueous layer was then removed and dried under vacuum (1.0 mm Hg) for 24 hours. The resulting amorphous solid was then recrystallized from toluene/$CHCl_3$ mixtures to produce the N-(2-carboxyethyl)-2,3,3-trimethylindolinium iodide product as 3.0 grams of a yellow solid (83.5 percent yield). $^1H$ and $^{13}C$ NMR spectra indicated the following:

$^1H$ NMR (400.1 MHz) in DMSO-$d_6$: δ7.97 (1H, m), 7.83 (1H, m), 7.59 (2H, m), 4.64 (2H, t, J=6, N—$CH_2$), 2.97 (2H, t, J=6, $CH_2CO$), 2.86 (3H, s, $CH_3$), 1.52 (6H, s, $CH_3$).

$^{13}C$ NMR (100.1 MHz) in DMSO-$d_6$: 198.0, 171.6, 141.8, 140.7, 129.5, 129.1, 123.7, 115.7, 54.4, 43.9, 31.3, 22.1, 15.0.

IB

Synthesis of N-(ethylpentanoyl)-2,3,3-trimethylindolinium Bromide

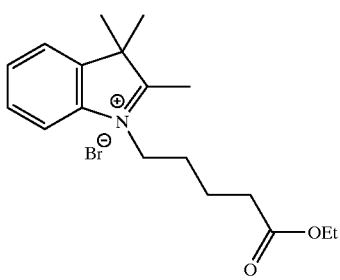

N-(ethylpentanoyl)-2,3,3-trimethylindolinium bromide was prepared by the process set forth in Example IA with 2,3,3-trimethylindolenine and ethyl 5-bromopentanoate to produce 2.65 grams (78 percent yield) of reddish-yellow crystals. $^1$H and $^{13}$C NMR spectra indicated the following:

$^1$H NMR (400.1 MHz) in DMSO-$d_6$: δ8.02 (1H, m), 7.83 (1H, m), 7.61 (2H, m), 4.48 (2H, t, J=6, N—CH$_2$), 4.01 (2H, t, J=7, O—CH$_2$), 2.84 (3H, s, CH$_3$), 2.40 (2H, t, J=7, CH$_2$CO), 2.08 (4H, m, —CH$_2$), 1.53 (6H, s, CH$_3$), 1.13 (3H, t, J=7 Hz).

$^{13}$C NMR (100.1 MHz) in DMSO-$d_6$: 197.0, 173.8, 172.3, 141.9, 141.2, 129.4, 128.9, 123.6, 115.3, 60.2, 54.3, 46.9, 30.3, 22.4, 22.0, 14.1.

IC

Synthesis of N-(5-carboxypentyl)-2,3,3-trimethylindolinium Bromide

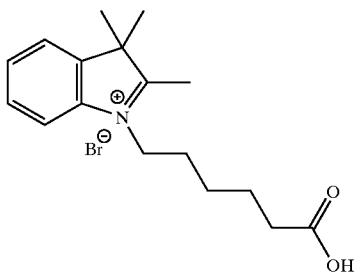

N-(5-carboxypentyl)-2,3,3-trimethylindolinium bromide was prepared by the process set forth in Example IA with 2,3,3-trimethylindolenine and 6-bromohexanoic acid to produce 2.43 grams (71.2 percent yield) of yellow crystals. $^1$H and $^{13}$C NMR spectra indicated the following:

$^1$H NMR (400.1 MHz) in DMSO-$d_6$: δ7.98 (1H, m), 7.86 (1H, m), 7.60 (2H, m), 4.46 (2H, t, J=6, N—CH$_2$), 2.85 (3H, s, CH$_3$), 2.21 (2H, t, J=7, CH$_2$CO), 1.83 (2H, m, —CH$_2$), 1.52 (6H, s, CH$_3$), 1.46 (4H, s, —CH$_2$—).

$^{13}$C NMR (100.1 MHz) in DMSO-$d_6$: 196.9, 174.7, 142.3, 141.5, 129.6, 129.4, 123.9, 115.9, 54.6, 47.9, 33.8, 27.4, 25.8, 24.5, 22.4, 14.6.

ID

Synthesis of 2,3,3-trimethylindolinium-N-propylsulfonate

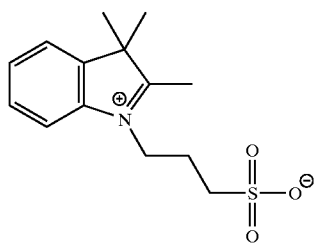

2,3,3-trimethylindolinium-N-propylsulfonate was prepared by the process set forth in Example IA with 2,3,3-trimethylindolenine and 1,3-propylsultone to produce 2.98 grams (94 percent yield) of white crystals. $^1$H and $^{13}$C NMR spectra indicated the following:

$^1$H NMR (400.1 MHz) in DMSO-$d_6$: δ7.99 (1H, m), 7.77 (1 H, m), 7.55 (2H, m), 4.60 (2H, t, J=7, N—CH$_2$), 2.78 (3H, s, CH$_3$), 2.61 (2H, t, J=7, CH$_2$SO$_3$_), 2.11 (2H, m, —CH$_2$—), 1.47 (6H, s, CH$_3$).

$^{13}$C NMR (100.1 MHz) in DMSO-$d_6$: 196.9, 142.2, 141.5, 129.6, 129.2, 123.7, 115.7, 54.4, 47.7, 46.9, 24.0, 22.3, 14.1.

IE

Synthesis of 2,3,3-trimethylindolinium-N-butylsulfonate

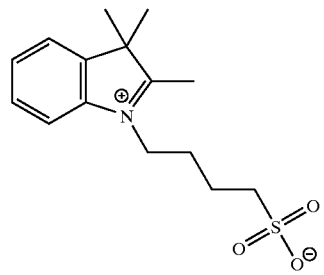

2,3,3-trimethylindolinium-N-butylsulfonate was prepared by the process set forth in Example IA with 2,3,3-trimethylindolenine and 1,4-butylsulfone to produce 2.86 grams (89.2 percent yield) of white crystals. $^1$H and $^{13}$C NMR spectra indicated the following:

$^1$H NMR (400.1 MHz) in DMSO-$d_6$: δ8.03 (1H, m), 7.82 (1H, m), 7.60 (2H, m), 4.48 (2H, t, J=7, N—CH$_2$), 2.85 (3H, s, CH$_3$), 2.49 (2H, m, CH$_2$SO$_3$_), 1.97 (2H, m, —CH$_2$—), 1.76 (2H, m, —CH$_2$—) 1.53 (6H, s, CH$_3$). $^{13}$C NMR (100.1 MHz) in DMSO-$d_6$: 196.9, 142.2, 141.5, 129.6, 129.2, 123.7, 115.7, 54.4, 47.7, 46.9, 24.0, 22.8, 22.3, 14.1.

EXAMPLE II

Preparation of Carboxylate Substituted Spiropyran Salts

Step 2: Synthesis of 6-nitro-benzoindolino spiropyrans (BIPS)

In the presence of a base, the functionalized salts were converted to an activated Fischer Base capable of undergoing a condensation reaction with 5-nitrosalicaldehyde. The solvent used in this reaction was ethanol, since the majority of spiropyrans are only partially soluble in this medium.

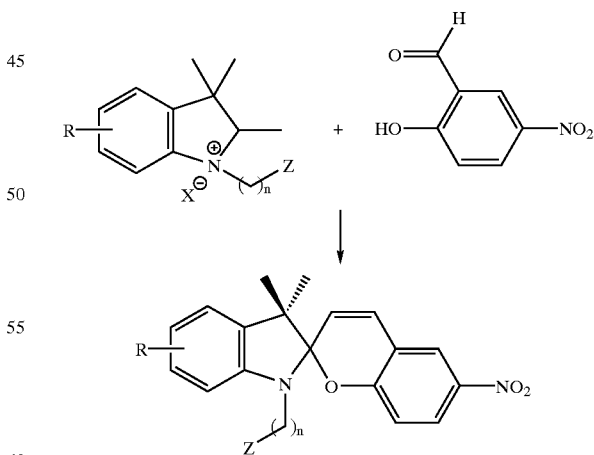

IIA

Synthesis of 6-Nitro-N-(2-carboxyethyl) spirobenzoindolinopyran

The general procedure for the preparation of the spiropyrans is illustrated through the condensation of 2-carboxyethyl-2,3,3-trimethylindolinium iodide with 5-nitrosalicaldehyde in the presence of a base, triethylamine.

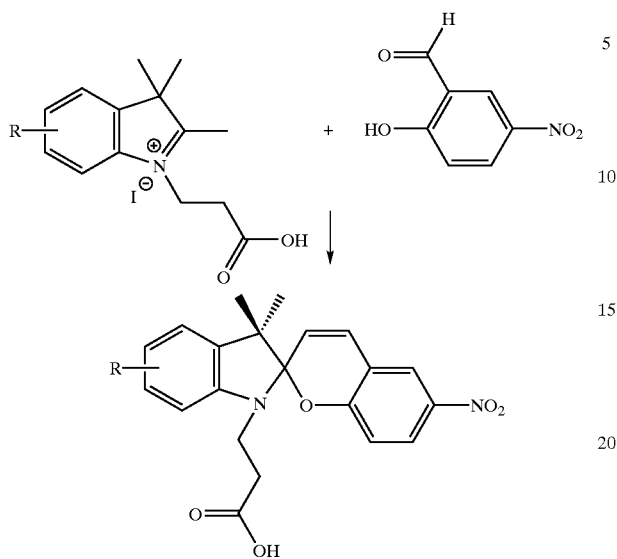

Into a 50 milliliter round-bottomed flask equipped with a water condenser topped with a pressure-equalized dropping funnel was added 2-carboxyethyl-2,3,3-trimethylindolinium iodide (prepared as described in Example IA; 1.0 gram, 2.78 mmol) and 5-nitrosalicaldehyde (0.50 gram, 3.0 mmol). Ethanol was added until the solids dissolved at reflux temperature, followed by addition of triethylamine (0.280 gram, 2.78 mmol) in 5 milliliters of ethanol via the dropping funnel over 20 minutes. Addition of the base resulted in an immediate color change to purple, signifying that spiropyran formation was occurring. The mixture was refluxed for 6 hours and then cooled to room temperature. The volume was concentrated to 5 milliliters before cooling the flask to 0° C. in a refrigerator for 24 hours. The spiropyran precipitate was filtered under vacuum and recrystallized from ethanol to give yellow crystals of 6-nitro-N-(2-carboxyethyl) spirobenzoindolinopyran, yield 0.763 grams (72.2 percent), melting point 192–194° C. $^1$H NMR, $^{13}$C NMR, IR, and UV-visible spectra indicated the following:

$^1$H NMR (400.1 MHz) in DMSO-$d_6$: δ8.21 (1H, d, J=3), 8.00 (1H, d, J=9), 7.21 (1H, d, J=10.5), 7.11 (2H, m), 6.87 (2H, m), 6.67 (1H, d, J=7.8), 6.00 (1H, d, J=10.5), 3.42 (2H, J=6, N—CH$_2$), 2.50 (2H, t, J=6, CH$_2$CO), 1.18 (3H, s, CH$_3$), 1.07 (3H, s, CH$_3$).

$^{13}$C NMR (100.1 MHz) in DMSO-$d_6$: 173.7, 159.9, 146.9, 141.3, 136.5, 129.0, 128.5, 126.5, 123.6, 122.6, 120.1, 119.7, 116.3, 107.5, 107.3, 53.5, 34.0, 26.4, 20.3.

IR (KBr, cm$^{-1}$): 3030, 3000, 2971, 1709, 1654, 1610, 1575, 1510, 1483, 1457, 1441, 1360, 1330, 1270, 1141, 1088, 1020, 915, 803.

UV-Visible (DMSO,$\lambda_{max}$ (ε)): 336 nm, 9,600 M$^{-1}$cm$^{-1}$.

Elemental analysis: Calculated for C$_{21}$H$_{20}$O$_5$N$_2$: C, 65.30; H, 5.26; N, 7.30. Found: C, 64.96; H, 5.23; N, 7.22.

IIB

Synthesis of 6-Nitro-(N-ethylpentanoyl) spirobenzoindolinopyran

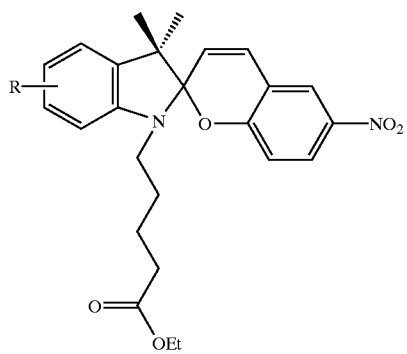

6-Nitro-(N-ethylpentanoyl)spirobenzoindolinopyran was prepared by the process set forth in Example IIA with 5-nitrosalicaldehyde and N-(ethylpentanoyl)-2,3,3-trimethylindolinium bromide (prepared as described in Example IB). $^1$H NMR spectra indicated the following:

$^1$H NMR (400.1 MHz) in CDCl$_3$: δ7.99 (2H, m), 7.15 (1H, t), 7.06 (1H, d), 6.86 (2H, t), 6.72 (1H, d), 6.60 (1H, t), 5.85 (1H, d), 4.08 (2H, q, O—CH$_2$), 3.17 (2H, t), 2.39 (2H, CH$_2$CO), 2.00 (4H, m, —CH$_2$), 1.22 (9H, m, CH$_3$).

Deprotection of the Chelating Functionality

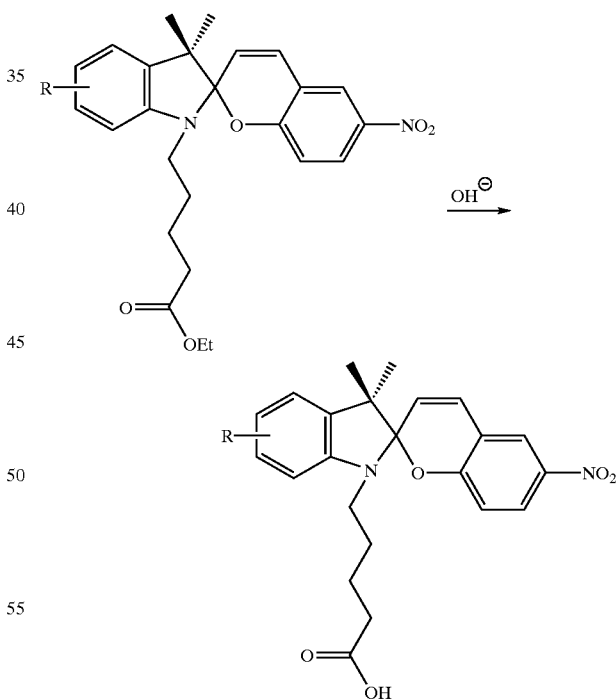

To a 50 milliliter round-bottomed flask equipped with a magnetic stir bar and an argon inlet was added finely ground 6-nitro-(N-ethylpentanoate)spirobenzoindolinopyran (1.0 gram, 2.28 mmol) and dissolved in 10 milliliters of THF. Sodium hydroxide (25 milliliters of a 1 Molar solution) was added to the solution and stirred for 24 hours before rotary evaporation at room temperature under high vacuum. The solids were dissolved in a minimum amount of water and the product was precipitated through neutralization with 1 Molar hydrochloric acid. Vacuum filtration isolated the solid, which was recrystallized from ethanol to yield 0.962 gram of yellow-red crystals of 6-nitro-(N-4-carboxylbutyl) spirobenzoindolinopyran (94 percent yield), melting point 139–141° C. $^1$H NMR, $^{13}$C NMR, IR, and UV-visible spectra indicated the following:

$^1$H NMR (400.1 MHz) in DMSO-$d_6$: δ8.19 (1H, d, J=2.8), 7.97 (1H, d, J=9.0), 7.19 (1H, d, J=10.4), 7.08 (2H, m), 6.84 (1H, d, J=7.2), 6.76 (1H, t, J=7.2), 6.57 (1H, d, J=7.8), 5.98 (1H, d, J=10.4), 3.10 (2H, m, N—$CH_2$), 2.16 (2H, t, J=6.8, $CH_2CO$), 1.55 (4H, m, —$CH_2$—), 1.18 (3H, s, $CH_3$), 1.09 (3H, s, $CH_3$).

$^{13}$C NMR: 174.4, 159.2, 146.7, 140.4, 135.6, 128.1, 127.6, 125.7, 122.8, 121.6, 118.9, 118.7, 115.4, 106.4, 52.2, 33.5, 28.0, 26.1, 24.2, 19.5.

IR (cm$^{-1}$): 3030, 3000, 2971, 1709, 1654, 1610, 1575, 1510, 1483, 1457, 1441, 1360, 1330, 1270, 1141, 1088, 1020, 915, 803.

UV-Visible (DMSO, $\lambda_{max}$ (ε)): 338 nm, 7,800 M$^{-1}$cm$^{-1}$.

Elemental analysis: Calculated for $C_{23}H_{24}O_5N_2$: C, 67.61; H, 5.89; N, 6.82. Found: C, 67.31; H, 5.92; N, 6.60.

IIC

Synthesis of 6-nitro-N-(5-carboxypentyl) spirobenzoindolinopyran

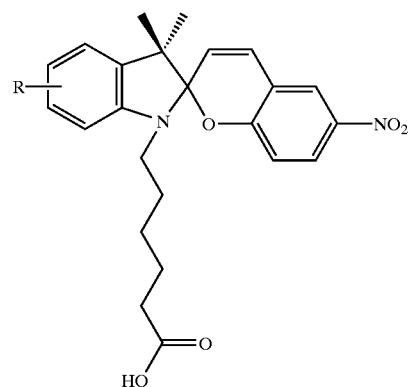

6-nitro-N-(5-carboxypentyl)spirobenzoindolinopyran was prepared by the process set forth in Example IIA with 5-nitrosalicaldehyde and N-(5-carboxypentyl)-2,3,3-trimethylindolinium bromide (prepared as described in Example IC) to produce 1.23 grams (48 percent yield) of yellow-red crystals, melting point 80–82° C. $^1$H NMR, $^{13}$C NMR, IR, and UV-visible spectra indicated the following:

$^1$H NMR (400.1 MHz) in DMSO-$d_6$: δ8.19 (1H, d, J=3.2), 8.00 (1H, d, J=9.0), 7.21 (1H, d, J=10.5), 7.08 (2H, m), 6.80 (2H, m), 6.57 (1H, d, J=7.8), 5.98 (1H, d, J=10.5), 3.10 (2H, m, N—$CH_2$), 2.13 (2H, m, $CH_2CO$), 1.45 (4H, m, —$CH_2$—), 1.20 (2H, m, —$CH_2$—), 1.18 (3H, s, $CH_3$), 1.07 (3H, s, $CH_3$).

$^{13}$C NMR: 174.4, 159.2, 146,7, 140.4, 135.6, 128.1, 127.6, 125.7, 122.8, 121.6, 118.9, 118.7, 115.4, 106.4, 52.2, 33.5, 28.0, 26.1, 25.8, 24.2, 19.5.

IR (cm$^{-1}$): 3030, 3000, 2971, 1709, 1654, 1610, 1575, 1510, 1483, 1457, 1441, 1360, 1330, 1270, 1141, 1088, 1020, 915, 803.

UV-Visible (DMSO, $\lambda_{max}$ (ε)): 342 nm, 8,400 M$^{-1}$cm$^{-1}$.

Elemental analysis: Calculated for $C_{24}H_{25}O_5N_2$: C, 68.20; H, 6.16; N, 6.70. Found: C, 68.30; H, 6.09; N, 6.52.

Step 3: Preparation of Carboxylate Salts

Preparation of the carboxylate salts entailed the treatment of an alcoholic solution of the spiropyran with about 1 molar equivalent of NaOEt or KOEt. A representative procedure is described through the reaction of 6-nitro-(N-carboxyethyl) spirobenzoindolinopyran with NaOEt:

IID

Synthesis of 6-Nitro-spirobenzoindolinopyran-N-ethylsodiumcarboxylate

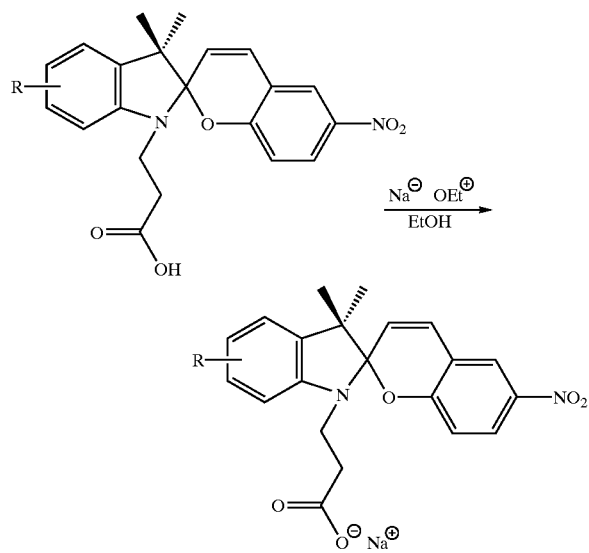

In a 50 milliliter round-bottomed flask equipped with a magnetic stir bar and an argon inlet was added finely ground 6-nitro-(N-carboxyethyl)spirobenzoindolinopyran (0.100 gram, 0.263 mmol) prepared as described in Example IIA and dissolved in 5 milliliters of ethanol. The mixture was then cooled to 0° C. in an ice bath before adding through a syringe 3.0 milliliters of an 8.64×10$^{-2}$ Molar NaOEt (0.265 mmol) solution. The reaction was stirred for 3 hours before rotary evaporation at room temperature under high vacuum. Recrystallization from ethanol gave 100 milligrams of yellow-red crystals of 6-nitro-spirobenzoindolinopyran-N-ethylsodiumcarboxylate (94.6 percent yield), melting point 202–204° C. $^1$H NMR, $^{13}$C NMR, IR, and UV-visible spectra indicated the following:

$^1$H NMR (400.1 MHz) in DMSO-$d_6$: δ8.17 (1H, d, J=2.8), 7.96 (1H, d, J=9.0), 7.15 (1H, d, J=10.5), 7.07 (2H, m), 6.83 (1H, d, J=9), 6.73 (1H, t, J=7.3), 6.58 (1 H, d, J=8.0), 5.98 (1H, d, J=10.5), 3.23 (2H, m, N—$CH_2$), 2.19 (2H, m, $CH_2CO$), 1.16 (3H, s, $CH_3$), 1.05 (3H, s, $CH_3$).

$^{13}$C NMR: 173.3, 159.2, 146.5, 140.3, 135.5, 127.7, 127.5, 125.5, 122.6, 122.0, 121.4, 118.8, 118.6, 115.3, 106.5, 106.4, 52.2, 36.2, 25.7, 19.5.

IR (cm$^{-1}$): 3020, 2970, 2923, 1652, 1607, 1588, 1507, 1480, 1450, 1330, 1275, 1218, 1156, 1123, 1090, 1020, 910, 803.

UV-Visible (DMSO, $\lambda_{max}$ (ε)): 338 nm, 8,400 M$^{-1}$cm$^{-1}$.

Elemental analysis (High resolution mass spectrometer (HRMS), fast atom bombardment with positive ions (FAB+)): Calculated for $C_{21}H_{21}O_5N_2$: 381.1451. Found: 381.1399.

IIE

Synthesis of 6-Nitrospirobenzoindolinopyran-N-butylpotassiumcarboxylate

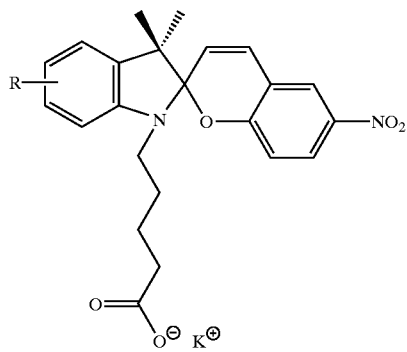

6-Nitrospirobenzoindolinopyran-N-butylpotassium carboxylate was prepared by the process set forth in Example IID with 6-nitro-(N-ethylpentanoyl)spirobenzoindolinopyran (prepared as described in Example IIB) to produce 0.94 gram of red crystals (94 percent yield), melting point 180–182° C. $^1$H NMR, $^{13}$C NMR, IR, and UV-visible spectra indicated the following:

$^1$H NMR (400.1 MHz) in DMSO-$d_6$: δ8.18 (1H, d, J=2.6), 7.97 (1H, d, J=9.0), 7.18 (1H, d, J=10.5), 7.10 (2H, m), 6.85 (1H, d, J=9), 6.74 (1H, t, J=7.3), 6.57 (1H, d, J=7.8), 5.98 (1H, d, J=10.5), 3.49 (1H, m, N—CH), 3.05 (1H, m, N—CH), 1.81 (2H, m, CH$_2$CO), 1.32 (2H, m, —CH$_2$—), 1.20 (2H, m, —CH$_2$—), 1.1 (3H, s, CH$_3$), 1.07 (3H, s, CH$_3$).

$^{13}$C NMR: 174.4, 159.2, 146.7, 140.4, 135.6, 128.1, 127.6, 125.7, 122.8, 121.6, 118.9, 118.7, 115.4, 106.6, 106.4, 52.2, 42.7, 28.0, 26.1, 25.8, 19.5.

IR (cm$^{-1}$): 3020, 2970, 2923, 1652, 1607, 1588, 1507, 1480, 1450, 1330, 1275, 1218, 1156, 1123, 1090, 1020, 910, 803.

UV-Visible (DMSO, $\lambda_{max}$ (ε)): 342 nm, 8,400 M$^{-1}$cm$^{-1}$.

Elemental analysis (HRMS (FAB+)): Calculated for $C_{23}H_{24}O_5N_2K$: 447.2677 Found: 447.2688.

IIF

Synthesis of 6-Nitrospirobenzoindolinopyran-N-pentylpotassium Carboxylate

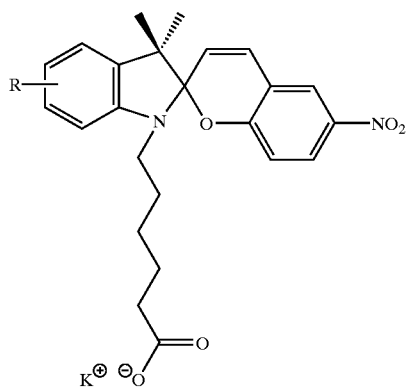

6-Nitrospirobenzoindolinopyran-N-pentylpotassium carboxylate was prepared by the process set forth in Example IID with 6-nitro-N-(5-carboxypentyl)spirobenzoindolinopyran (prepared as described in Example IIC) to produce 0.54 grams (73 percent yield) of dark red 6-nitrospirobenzoindolinopyran-N-pentylpotassium carboxylate crystals, melting point 100–102° C. $^1$H NMR, $^{13}$C NMR, IR, and UV-visible spectra indicated the following:

$^1$H NMR (400.1 MHz) in DMSO-$d_6$: δ8.17 (1H, d, J=2.8), 7.97 (1H, d, J=9.0), 7.18 (1H, d, J=10.5), 6.84 (2H, m), 6.84 (1H, d, J=9), 6.77 (1H, t, J=7.6), 6.55 (1H, d, J=7.8), 5.98 (1H, d, J=10.5), 3.10 (2H, m, N—CH$_2$), 1.79 (2H, m, CH$_2$CO), 1.45 (4H, m, —CH$_2$—), 1.20 (2H, m, —CH$_2$—), 1.18 (3H, s, CH$_3$), 1.05 (3H, s, CH$_3$).

$^{13}$C NMR: 174.4, 159.2, 146.7, 140.4, 135.6, 128.1, 127.6, 125.7, 125.2, 122.8, 121.8, 118.8, 118.7, 115.4, 106.4, 52.2, 43.0, 33.5, 28.0, 26.1, 25.8, 24.2, 19.5, 14.1.

IR (cm$^{-1}$): 3020, 2970, 2923, 1652, 1607, 1588, 1507, 1480, 1450, 1330, 1275, 1218, 1156, 1123, 1090, 1020, 910, 803.

UV-Visible (DMSO, $\lambda_{max}$ (ε)): 342 nm, 8,400 M$_{-1}$cm$^{-1}$.

Elemental analysis (HRMS (FAB+)): Calculated for $C_{24}H_{25}O_5N_2K$: 461.2424. Found: 461.2445.

EXAMPLE III

Preparation of Sulfonate Substituted Spiropyran Salts

Step 2: Synthesis of 6-nitro-benzoindolinospiropyrans (BIPS)

IIA

Synthesis of 6-Nitro-spirobenzoindolinopyran-N-propyl-triethylammoniumsulfonate

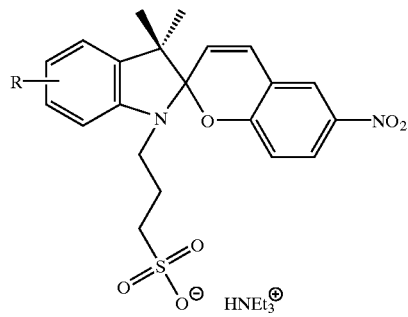

6-Nitro-spirobenzoindolinopyran-N-propyl-triethyl ammoniumsulfonate was prepared by the process set forth in Example IIA with 5-nitrosalicaldehyde and 2,3,3-trimethylindolinium-N-propylsulfonate (prepared as described in Example ID). The product was recrystallized from ethyl acetate to produce 1.43 grams (52 percent yield) of yellow crystals, melting point 188–190° C. $^1$H NMR, $^{13}$C NMR, IR, and UV-visible spectra indicated the following:

$^1$H NMR (400.1 MHz) in DMSO-$d_6$: δ8.27 (1H, d, J=2.8), 8.04 (1H, d, J=9.0), 7.26 (1H, d, J=10.4), 7.15 (2H, m), 6.83 (3H, m), 6.03 (1H, d, J=10.4), 3.29 (2H, t, J=7.3, N—CH$_2$), 3.13 (6H, q, J=7.3, CH$_2$CH$_3$), 2.50 (2H, m, CH$_2$SO$_3$) 1.49 (2H, m, —CH$_2$—), 1.25 (9H, t, CH$_3$), 1.19 (3H, s, CH$_3$), 1.16 (3H, s, CH$_3$).

$^{13}$C NMR: 159.2, 146.7, 140.4, 135.5, 128.1, 127.6, 125.7, 122.8, 121.6, 121.5, 118.9, 118.7, 115.4, 106.4, 106.4, 52.2, 49.0, 45.7, 42.2, 24.7, 19.5, 8.55.

IR (cm$^{-1}$): 3020, 2970, 2684, 2510, 1652, 1607, 1510, 1483, 1457, 1333, 1275, 1218, 1156, 1123, 1089, 1020, 916, 805.

UV-Visible (DMSO, $\lambda_{max}$ ($\epsilon$)): 342 nm, 8,600 M$^{-1}$cm$^{-1}$.

Elemental analysis: Calculated for $C_{27}H_{37}O_6N_3S$: C, 61.05; H, 6.70; N, 7.90; S, 5.94. Found: C, 61.30; H, 6.67; N, 7.83; S, 5.86.

IIIB

Synthesis of 6-Nitro-spirobenzoindolinopyran-N-butyl-triethylammoniumsulfonate

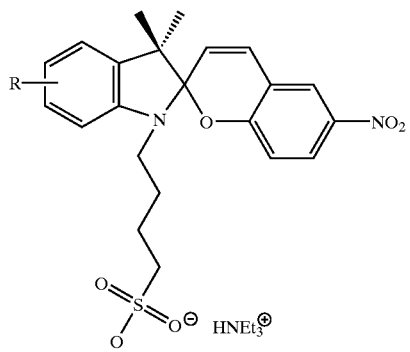

6-nitro-spirobenzoindolinopyran-N-butyl-triethylammonium sulfonate was prepared by the process set forth in Example IIA with 5-nitrosalicaldehyde and 2,3,3-trimethylindolinium-N-butylsulfonate (prepared as described in Example IE). The product was recrystallized from ethyl acetate to produce 0.86 gram (36 percent yield) of purple crystals, melting point 208–210° C. $^1$NMR, $^{13}$C NMR, IR, and UV-visible spectra indicated the following:

$^1$H NMR (400.1 MHz) in DMSO-$d_6$: δ8.27 (1H, d, J=2.8), 8.04 (1H, d, J=9.0), 7.26 (1H, d, J=10.4), 7.15 (2H, m), 6.83 (3H, m), 6.03 (1H, d, J=10.4), 3.29 (2H, t, J=7.3, N—CH$_2$), 3.13 (6H, q, J=7.3, CH$_2$CH$_3$), 2.50 (2H, m, CH$_2$SO$_3$) 1.49 (4H, m, —CH$_2$—), 1.25 (9H, t, CH$_3$), 1.19 (3H, s, CH$_3$), 1.16 (3H, s, CH$_3$).

$^{13}$C NMR: 159.2, 146.7, 140.4, 135.6, 128.1, 127.6, 125.7, 122.8, 121.6, 118.9, 118.7, 115.4, 106.4, 59.7, 52.2, 42.5, 33.3, 28.0, 25.8, 24.2, 22.1, 19.5, 14.0.

IR (cm$^{-1}$): 3020, 2970, 2684, 2510, 1652, 1607, 1510, 1483, 1457, 1333, 1275, 1218, 1156, 1123, 1089, 1020, 916, 805.

UV-Visible (DMSO, $\lambda_{max}$ ($\epsilon$)): 344 nm, 9,000 M$^{-1}$cm$^{-1}$.

Elemental analysis: Calculated for $C_{28}H_{39}O_6N_3S$: C, 59.70; H, 6.90; N, 7.52; S, 5.70. Found: C, 59.64; H, 6.84; N, 7.43; S, 5.62.

EXAMPLE IV

Preparation of an Electrophoretic Ink

In a Union Process 1-S Attritor (Union Process Co., Akron, Ohio) is placed 200 grams of a copolymer of ethylene and methacrylic acid (89:11 molar ratio) with a melt index at 190° C. of 100 and an acid number of 66, 22 grams of the spiropyran 6-nitro-spirobenzoindolinopyran-N-ethylsodiumcarboxylate prepared as described in Example IID, 6 grams of zinc chloride, and 1000 grams of ISOPAR® L (Exxon Corp.). The attritor contents are heated to 100° C. and milled at a rotor speed of 230 rpm with 4.76 mm diameter stainless steel balls for two hours. The attritor is then cooled to room temperature while the milling is continued. Subsequently, 700 grams of ISOPAR® H is added to the attritor contents and milling is continued at a rotor speed of 330 rpm for 3 hours. The resulting particulate polymer dispersion is then drained to a holding tank. Thereafter, 92 grams of Basic Barium Petronate (Witco Chemical, New York, N.Y.) are added to the dispersion with stirring. Sufficient ISOPAR® H is also added to the dispersion to result in a 2 percent by weight solids dispersion, and the dispersion is stirred for 3 hours.

EXAMPLE V

The process of Example IV is repeated except that the spiropyran 6-nitro-spirobenzoindolinopyran-N-ethylsodiumcarboxylate is replaced with the spiropyran 6-nitrospirobenzoindolinopyran-N-butylpotassium carboxylate prepared as described in Example IIE.

EXAMPLE VI

The process of Example IV is repeated except that the spiropyran 6-nitro-spirobenzoindolinopyran-N-ethylsodiumcarboxylate is replaced with the spiropyran 6-ntrospirobenzoindolinopyran-N-pentylpotassium carboxylate prepared as described in Example IIF.

EXAMPLE VII

The process of Example IV is repeated except that the spiropyran 6-nitro-spirobenzoindolinopyran-N-ethylsodiumcarboxylate is replaced with the spiropyran 6-nitro-spirobenzoindolinopyran-N-propyl-triethyl ammoniumsulfonate prepared as described in Example IIIA.

EXAMPLE VIII

The process of Example IV is repeated except that the spiropyran 6-nitro-spirobenzoindolinopyran-N-ethylsodiumcarboxylate is replaced with the spiropyran 6-nitro-spirobenzoindolinopyran-N-butyl-triethylammonium sulfonate prepared as described in Example IIIB.

EXAMPLE IX

Preparation of an Electrophoretic Ink

A photochromic electrophoretic ink is prepared as follows. A copolymer of ethylene (90 percent by weight) and methacrylic acid (10 percent by weight) (NUCREL® 599, Du Pont, 3.90 grams), an aluminum stearate charge control agent (WITCO® 22, Witco Chemical Co., 0.1 gram), the spiropyran 6-nitro-spirobenzoindolinopyran-N-ethylsodiumcarboxylate prepared as described in Example IID (1.00 gram), calcium chloride (molar ratio of 10 moles calcium chloride per one mole of spiropyran), and an isoparaffinic hydrocarbon liquid (ISOPAR® L, 170 grams) are heated in a Union Process 01 attritor containing 2,400 grams of stainless steel ³⁄₁₆ inch chrome-coated shot until 200° F. is achieved. After 10 minutes, heating is discontinued and ambient temperature stirring is maintained for 2 hours. Water cooling and stirring are then continued for 4 more hours. The ink is then washed from the shot with 63.1 grams of ISOPAR® L using a strainer, and additional ISOPAR® L is then added, resulting in an ink with a solids content of about 1 percent by weight. To this ink is added a charge control agent (lecithin), added dropwise until a conductivity of 12 picomhos per centimeter is achieved.

EXAMPLE X

The process of Example IX is repeated except that the spiropyran 6-nitro-spirobenzoindolinopyran-N-ethylsodiumcarboxylate is replaced with the spiropyran 6-nitrospirobenzoindolinopyran-N-butylpotassium carboxylate prepared as described in Example IIE.

EXAMPLE XI

The process of Example IX is repeated except that the spiropyran 6-nitro-spirobenzoindolinopyran-N-ethylsodiumcarboxylate is replaced with the spiropyran 6-ntrospirobenzoindolinopyran-N-pentylpotassium carboxylate prepared as described in Example IIF.

EXAMPLE XII

The process of Example IX is repeated except that the spiropyran 6-nitro-spirobenzoindolinopyran-N-ethylsodiumcarboxylate is replaced with the spiropyran 6-nitro-spirobenzoindolinopyran-N-propyl-triethyl ammoniumsulfonate prepared as described in Example IIIA.

EXAMPLE XIII

The process of Example XV is repeated except that the spiropyran 6-nitro-spirobenzoindolinopyran-N-ethylsodiumcarboxylate is replaced with the spiropyran 6-nitro-spirobenzoindolinopyran-N-butyl-triethylammonium sulfonate prepared as described in Example IIIB.

EXAMPLE XIV

The electrophoretic inks prepared in Examples IV through XIII are incorporated into an apparatus as illustrated in FIG. 1 and FIG. 2D. Application of an electric field across the electrodes causes the particles to migrate through the suspending fluid.

EXAMPLE XV

Preparation of Microencapsulated Electrophoretic Inks and Displays

Step 1: Preparation of Oil Phase

To a 1 liter flask is added 417.25 grams of Halogenated Hydrocarbon Oil 0.8 (Halogenated Hydrocarbon Products Corp.) and 73.67 grams of ISOPAR® G (Exxon). The mixture is stirred at 60° C. for six hours and is then cooled to room temperature. Thereafter, 50.13 grams of the resulting solution is placed in a 50 milliliter polypropylene centrifuge tube, to which is added 1.8 grams of the particles prepared in Example IV, 0.78 gram of a 10 percent solution of OLOA 1200 (Chevron) in Halogenated Hydrocarbon Oil 0.8, and 0.15 gram of Span 85 (Aldrich). This mixture is then sonicated for five minutes at power 9 in an Aquasonic Model 75D sonicator (UWR, Westchester, Pa.) at 30° C.

Step 2: Preparation of Aqueous Phase 10 grams of acacia (Aldrich) is dissolved in 100 grams of water with stirring at room temperature for 30 minutes. The resulting mixture is decanted into two 50 milliliter polypropylene centrifuge tubes and centrifuged at about 2,000 rpm for 10 minutes to remove insoluble material. 66 grams of the purified solution is then decanted into a 500 milliliter non-baffled jacketed reactor, and the solution is then heated to 40° C. A six-blade (vertical geometry) paddle agitator is then placed just beneath the surface of the liquid. While agitating the solution at 200 rpm, 6 grams of gelatin (300 bloom, type A, Aldrich) is carefully added over about 20 seconds in order to avoid lumps. Agitation is then reduced to 50 rpm to reduce foaming. The resulting solution is then stirred for 30 minutes.

Step 3: Encapsulation

With agitation at 200 rpm, the oil phase, prepared as described in Step 1, is slowly poured over about 15 seconds into the aqueous phase prepared as described in Step 2. The resulting oil/water emulsion is allowed to emulsify for 20 minutes. To this emulsion is then slowly added over about 20 seconds 200 grams of water that has been preheated to 40° C. The pH is then reduced to 4.4 over five minutes by addition of a 10 percent acetic acid solution (acetic acid from Aldrich). The pH is monitored using a pH meter that has been previously calibrated with pH 7.0 and pH 4.0 buffer solutions and the emulsion is stirred for 40 minutes. 150 grams of water that has been preheated to 40° C. is then added, and the contents of the reactor are then cooled to 10° C. When the solution temperature reaches 10° C., 3.0 milliliters of a 37 percent formalin solution (Aldrich) is added, and the solution is further stirred for another 60 minutes. 20 grams of sodium carboxymethylcellulose is added, and the pH is then raised to 10.0 by the addition of a 20 weight percent solution of sodium hydroxide. The thermostat bath is then set to 40° C. and allowed to stir for another 70 minutes. The slurry is allowed to cool to room temperature overnight with stirring. The resulting capsule slurry is then ready to be sieved.

Step 4: Formation of Display

A first display is prepared as follows. The capsule slurry prepared as described in Step 3 is mixed with an aqueous urethane binder NeoReze® R-9320 (Zeneca Resins) at a ratio of one part binder to 10 parts capsules. The resulting mixture is then coated using a doctor blade onto a 0.7 millimeter thick sheet of indium tin oxide sputtered polyester film. The blade gap of the doctor blade is controlled at 0.18 millimeters so as to lay down a single layer of capsules. The coated film is then dried in hot air (60° C.) for 30 minutes. After drying, the dried film is hot laminated at 60° C. to a backplane comprising a 3 millimeter thick sheet of polyester screen printed with thick film silver and dielectric inks with a pressure of 15 pounds per square inch in a hot roll laminate from Cheminstruments, Fairfield, Ohio. The backplane is connected to the film using an anisotropic tape. The conductive areas form addressable areas of the resulting display.

A second display is prepared as follows. The capsule slurry prepared as described in Step 3 is mixed with an aqueous binder comprising a mixture of NeoRez® 966 (Zeneca Resins) and a 20 percent solution of AIRVOL® 203 (a polyvinyl alcohol, Airvol Industries) at a ratio of one part AIRVOL® 203 solution to one part NeoRez® R-966 to five parts capsules. The resulting mixture is then coated using a doctor blade onto a 0.7 millimeter thick sheet of indium tin oxide sputtered polyester film. The blade gap of the doctor blade is controlled to 0.18 millimeter so as to lay down an single layer of capsules. The coated film is then dried in hot air (60° C.) for 30 minutes. After drying, a thick film silver ink is then printed directly onto the back of the dried film and allowed to cure at 60° C. The conductive areas form the addressable areas of the display.

Steps 1 through 4 are repeated except with the electrophoretic inks prepared in Examples V through XIII instead of the electrophoretic ink prepared in Example IV.

EXAMPLE XVI

Preparation of Microencapsulated Electrophoretic Inks and Displays

In a 500 milliliter non-baffied jacketed reactor is mixed 50 milliliters of a 10 weight percent aqueous solution of ethylene co-maleic anhydride (Aldrich), 100 milliliters of water, 0.5 gram of resorcinol (Aldrich), and 5.0 grams of urea (Aldrich). The mixture is stirred at 200 rpm and the pH adjusted to 3,5 by addition of a 25 weight percent sodium hydroxide solution over a period of 1 minute. The pH is monitored using a pH meter that has been previously calibrated with pH 7.0 and pH 4.0 buffer solutions. To this mixture is slowly added an oil phase prepared as described in Step 1 of Example XV, and agitation is increased to 450 rpm to reduce the average particle size to less than 200 microns. 12.5 grams of a 37 weight percent aqueous formaldehyde solution is then added and the temperature is raised to 55° C. The solution is heated at 55° C. for two hours. The microcapsules thus formed are then formed into displays by the method described in Step 4 of Example XV.

The process is repeated except with the electrophoretic inks prepared in Examples V through XIII instead of the electrophoretic ink prepared in Example IV.

EXAMPLE XVII

Preparation of Microencapsulated Electrophoretic Inks and Displays

To 44 grams of an oil phase prepared as described in Step 1 of Example XV is added 1 gram of sebacoyl chloride (Aldrich). Three milliliters of the mixture is then dispersed in 200 milliliters of water with stirring at 300 rpm at room temperature. To this dispersion is then added 2.5 milliliters of a 10 weight percent aqueous solution of 1,6-diaminohexane. Capsules form after about one hour. The microcapsules thus formed are then formed into displays by the method described in Step 4 of Example XV.

The process is repeated except with the electrophoretic inks prepared in Examples V through XIII instead of the electrophoretic ink prepared in Example IV.

Other embodiments and modifications of the present invention may occur to those of ordinary skill in the art subsequent to a review of the information presented herein; these embodiments and modifications, as well as equivalents thereof, are also included within the scope of this invention.

What is claimed is:

1. An electrophoretic ink comprising a suspending fluid and, suspended in the suspending fluid, a plurality of particles comprising a mixture of a chelating agent and a spiropyran material of the formula

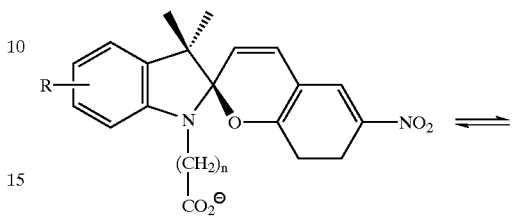

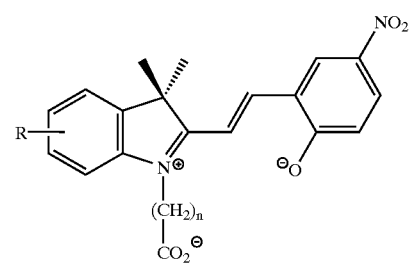

or

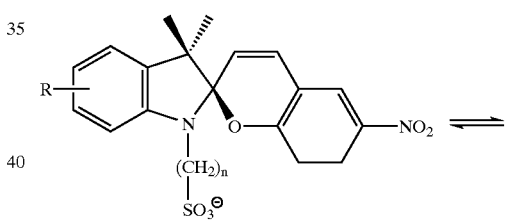

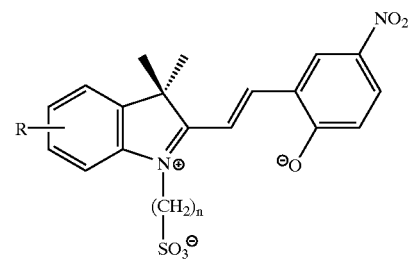

wherein n is an integer representing the number of repeat —$CH_2$— units and R is —H or —CH=$CH_2$, said particles being free to migrate within said suspending fluid under the influence of an electric field.

2. An electrophoretic ink according to claim 1 wherein the spiropyran material is of the formula

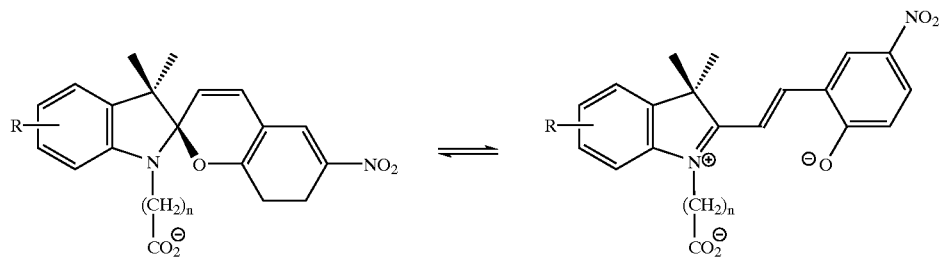
wherein n is an integer of from about 2 to about 8.
3. An electrophoretic ink according to claim 1 wherein the spiropyran material is of the formula
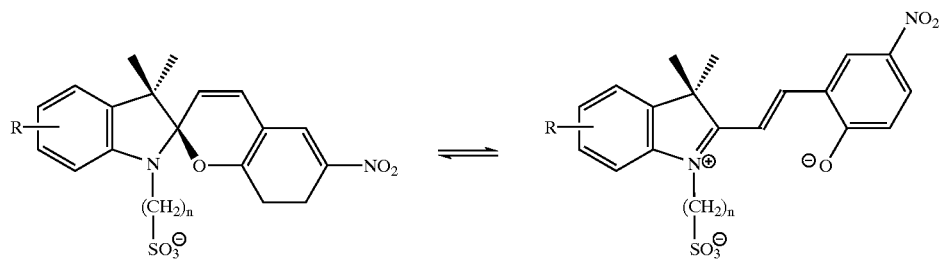
wherein n is an integer of from about 2 to about 8.
4. An electrophoretic ink according to claim 1 wherein the spiropyran material is of the formula
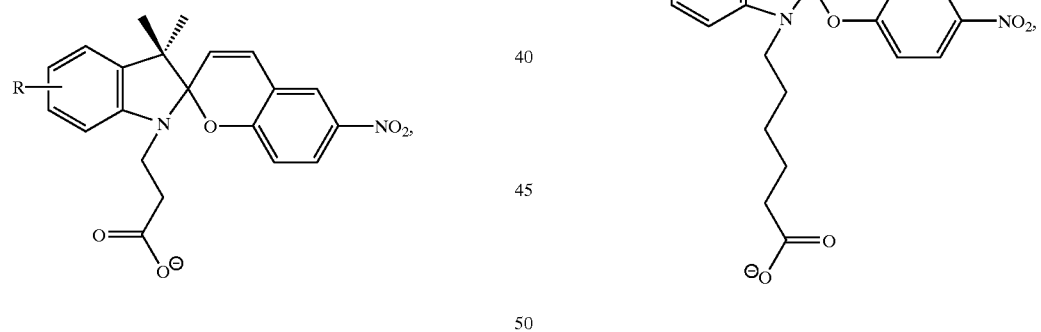
-continued
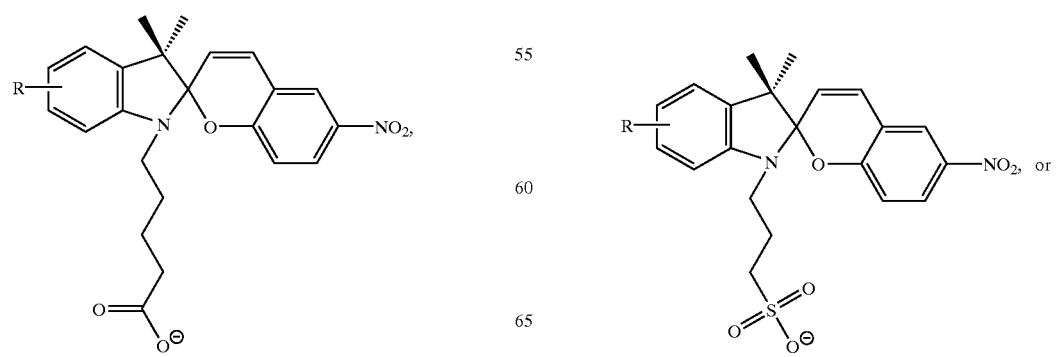

-continued

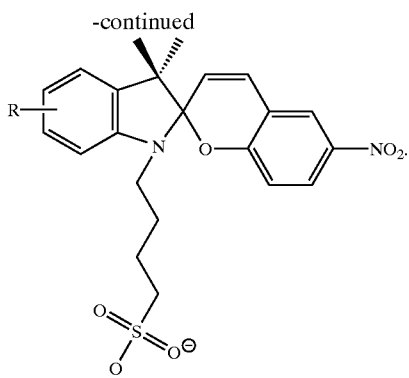

5. An electrophoretic ink according to claim 1 wherein the spiropyran material is present in the particles in an amount of at least about 0.01 percent by weight of the particles.

6. An electrophoretic ink according to claim 1 wherein the spiropyran material is present in the particles in an amount of at least about 0.01 percent by weight of the particles, and wherein the spiropyran material is present in the particles in an amount of no more than about 1 percent by weight of the particles.

7. An electrophoretic ink according to claim 1 wherein the chelating agent is a metal salt in the +2 state.

8. An electrophoretic ink according to claim 1 wherein the chelating agent is a salt of calcium, magnesium, zinc, or a transition metal.

9. An electrophoretic ink according to claim 1 wherein the chelating agent is present in the particles in an amount relative to the spiropyran material of at least about 1 mole of chelating agent for every 1 mole of spiropyran material.

10. An electrophoretic ink according to claim 1 wherein the chelating agent is present in the particles in an amount relative to the spiropyran material of at least about 2 moles of chelating agent for every 1 mole of spiropyran material, and wherein the chelating agent is present in the particles in an amount relative to the spiropyran material of no more than about 10 moles of chelating agent for every 1 mole of spiropyran material.

11. An electrophoretic ink according to claim 1 further containing a charge control agent.

12. An electrophoretic ink according to claim 11 wherein the charge control agent is present in the ink in an amount of at least about 0.001 percent by weight of the ink, and wherein the charge control agent is present in the ink in an amount of no more than about 3 percent by weight of the ink.

13. An electrophoretic ink according to claim 1 wherein, in addition to the particles containing the spiropyran and the chelating agent, the ink further contains a plurality of second particles, said second particles being of a color different from the particles containing the spiropyran and the chelating agent, wherein said second particles and said particles containing the spiropyran and the chelating agent have substantially different electrophoretic mobilities in said enabling fluid.

14. An electrophoretic ink according to claim 1 wherein the electrophoretic ink is disposed in a plurality of voids in a binder, each of said voids containing the suspending fluid and a plurality of the particles.

15. An electrophoretic ink according to claim 1 wherein the electrophoretic ink is disposed in a plurality of microcapsules, each of said microcapsules containing the suspending fluid and a plurality of the particles.

16. An electrophoretic ink according to claim 15 wherein said microcapsules are dispersed in a binder.

17. A display which comprises (a) an electrophoretic ink according to claim 1, wherein at least some of the particles in said ink have either a positive polarity or a negative polarity, (b) at least one first electrode, (c) at least one second electrode, and (d) means for selectively applying an electrical field between said at least one first electrode and said at least one second electrode, whereby said particles having either a positive polarity or a negative polarity migrate through said enabling fluid toward an electrode having a polarity opposite to their own.

18. A display according to claim 17 wherein the electrophoretic ink is disposed in cavities in a substrate.

19. A display according to claim 17 wherein the electrophoretic ink is disposed in a plurality of microcapsules.

20. A display according to claim 19 wherein said microcapsules are dispersed in a binder.

21. A process which comprises (a) providing an electrophoretic ink according to claim 1, wherein at least some of the particles in said ink have either a positive polarity or a negative polarity; (b) applying to the ink in an imagewise pattern an electrical field, thereby causing said particles having either a positive polarity or a negative polarity to migrate through said suspending fluid in an imagewise pattern; and (c) exposing said ink to radiation at a wavelength effective to cause the spiropyran material in the particles to shift to a merocyanine form.

22. A process according to claim 21 wherein subsequent to step (c) the ink is exposed to radiation at a wavelength effective to cause at least some of the particles containing the material in the merocyanine form to shift back to the spiropyran.

* * * * *